United States Patent [19]

Nicodemus et al.

[11] 4,054,754
[45] Oct. 18, 1977

[54] ARRANGEMENT FOR TRANSMITTING DIGITAL DATA AND SYNCHRONIZING INFORMATION

[75] Inventors: Keith Lynn Nicodemus, Wheaton, Ill.; Stephen Davis Shoap, Tinton Falls, N.J.

[73] Assignee: Bell Telephone Laboratories, Incorporated, Murray Hill, N.J.

[21] Appl. No.: 693,372

[22] Filed: June 7, 1976

[51] Int. Cl.² ............................................ H04J 3/06
[52] U.S. Cl. ............................... 179/15 BS; 178/69.1
[58] Field of Search ............ 179/15 BS; 178/69.5 R, 178/69.1

[56] References Cited

U.S. PATENT DOCUMENTS

| | | | |
|---|---|---|---|
| 3,701,894 | 10/1972 | Low et al. | 178/69.5 R X |
| 3,742,199 | 6/1973 | Lubarsky | 178/69.5 R X |
| 3,783,383 | 1/1974 | Forster et al. | 178/69.5 R X |

Primary Examiner—Thomas W. Brown
Attorney, Agent, or Firm—Kenneth H. Samples

[57] ABSTRACT

A high capacity time-division switching system is disclosed which includes a digital data transmission system for transmitting both digital data words and synchronizing information. The predetermined bit positions of each data word, which bit positions are to convey data only, are encoded and transmitted as a combination of the true and complement representation of those digits. The remaining bit positions, which are used to convey both data and synchronizing information, are encoded and transmitted as true representations only. A digital data receiver responds to the data so encoded by extracting synchronizing information based on the violation of the predominately true and complement coding format.

18 Claims, 31 Drawing Figures

TIMING DIAGRAM
DIGITAL DATA TRANSMITTER
AND
VOICEBAND INTERFACE FRAME

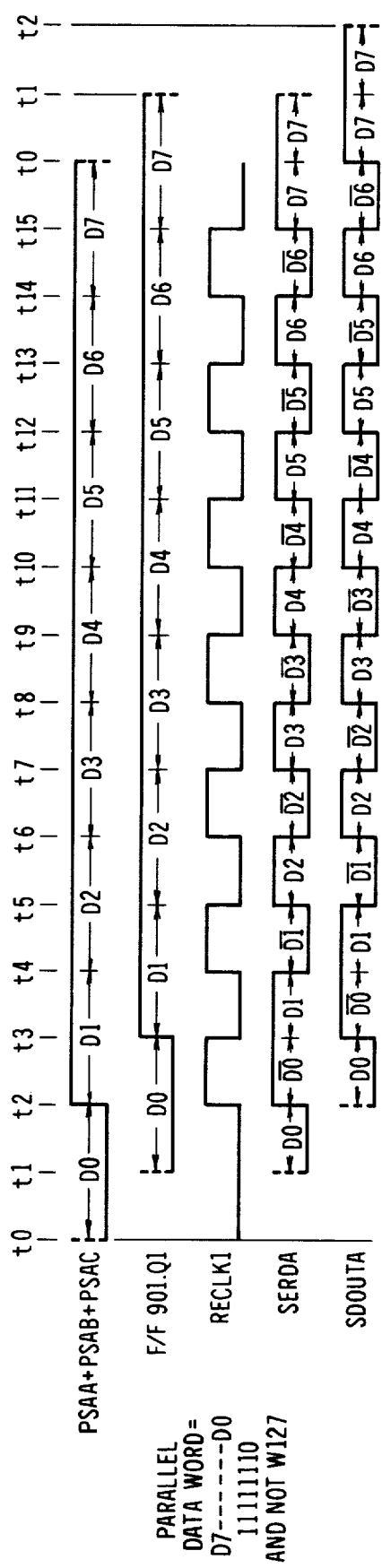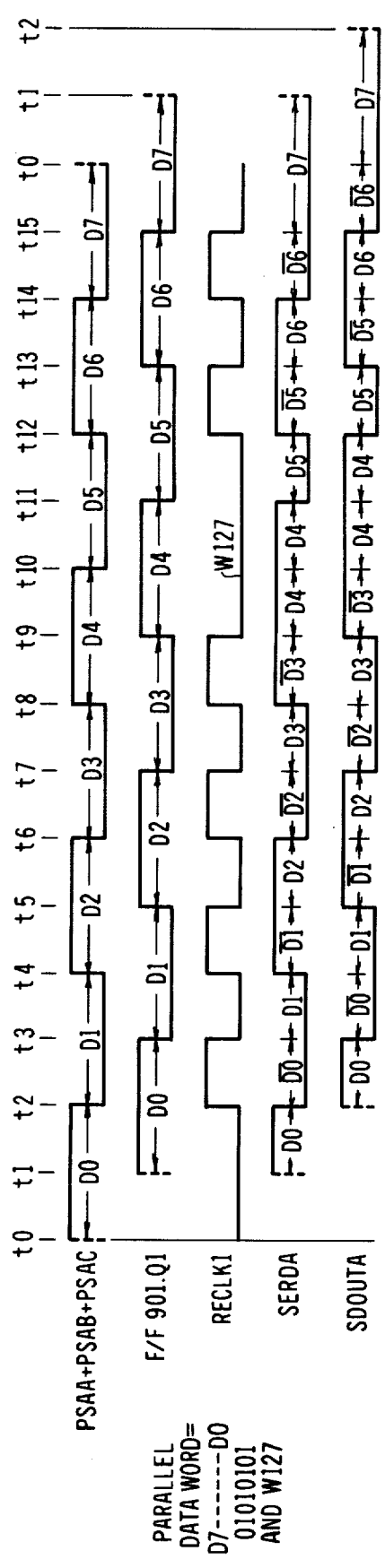

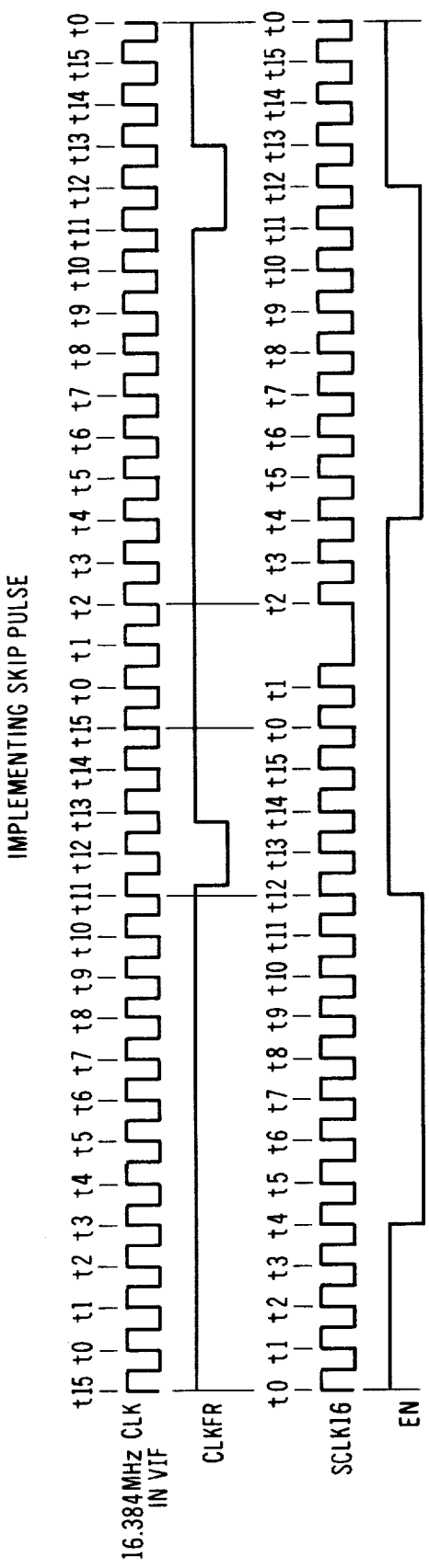

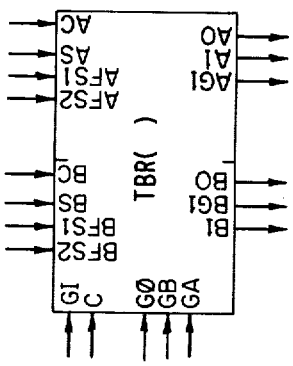
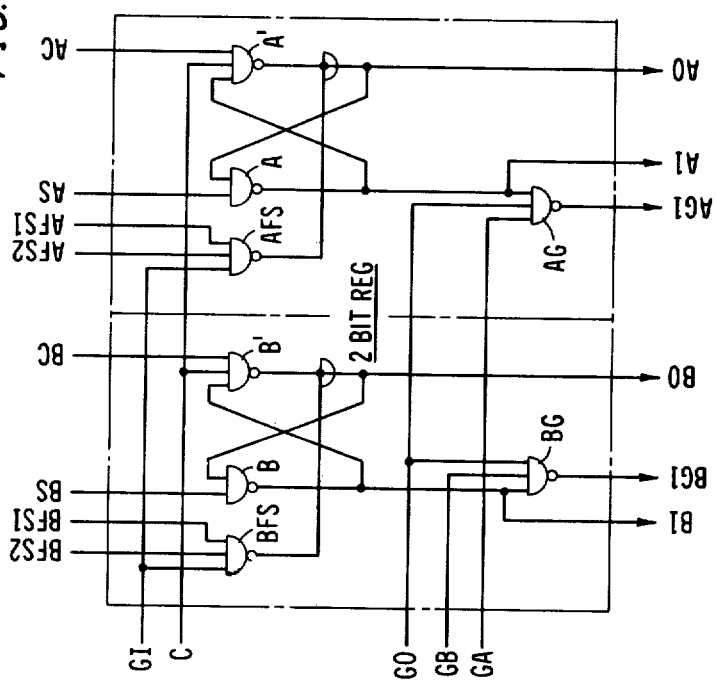
FIG. 20

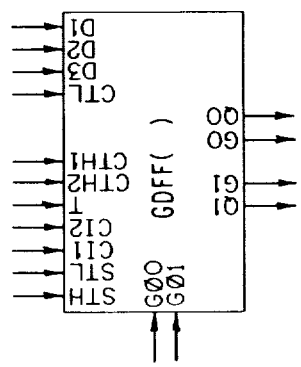
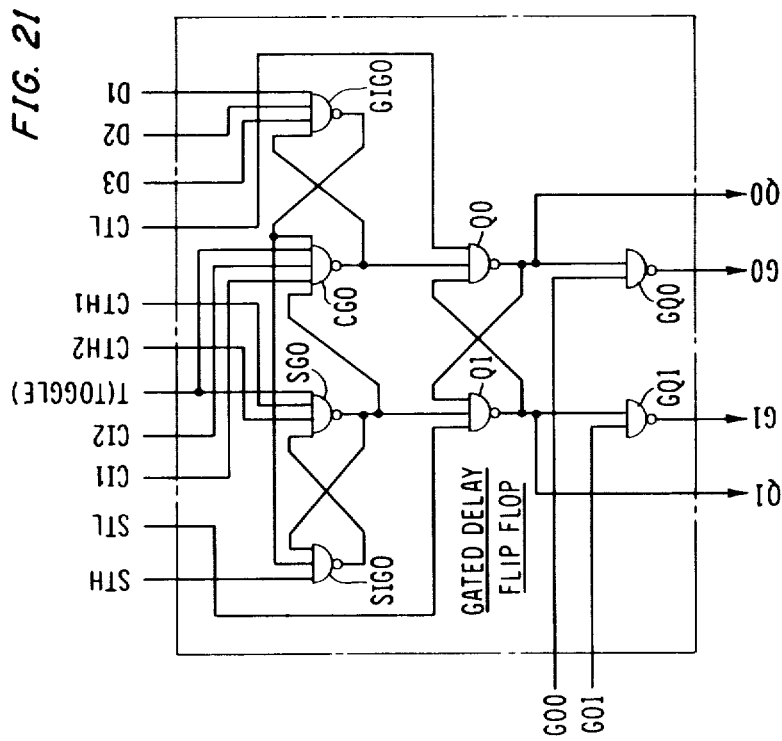
FIG. 21

TIMING DIAGRAM
DIGITAL DATA RECEIVER

TIMING DIAGRAM
DIGITAL DATA RECEIVER

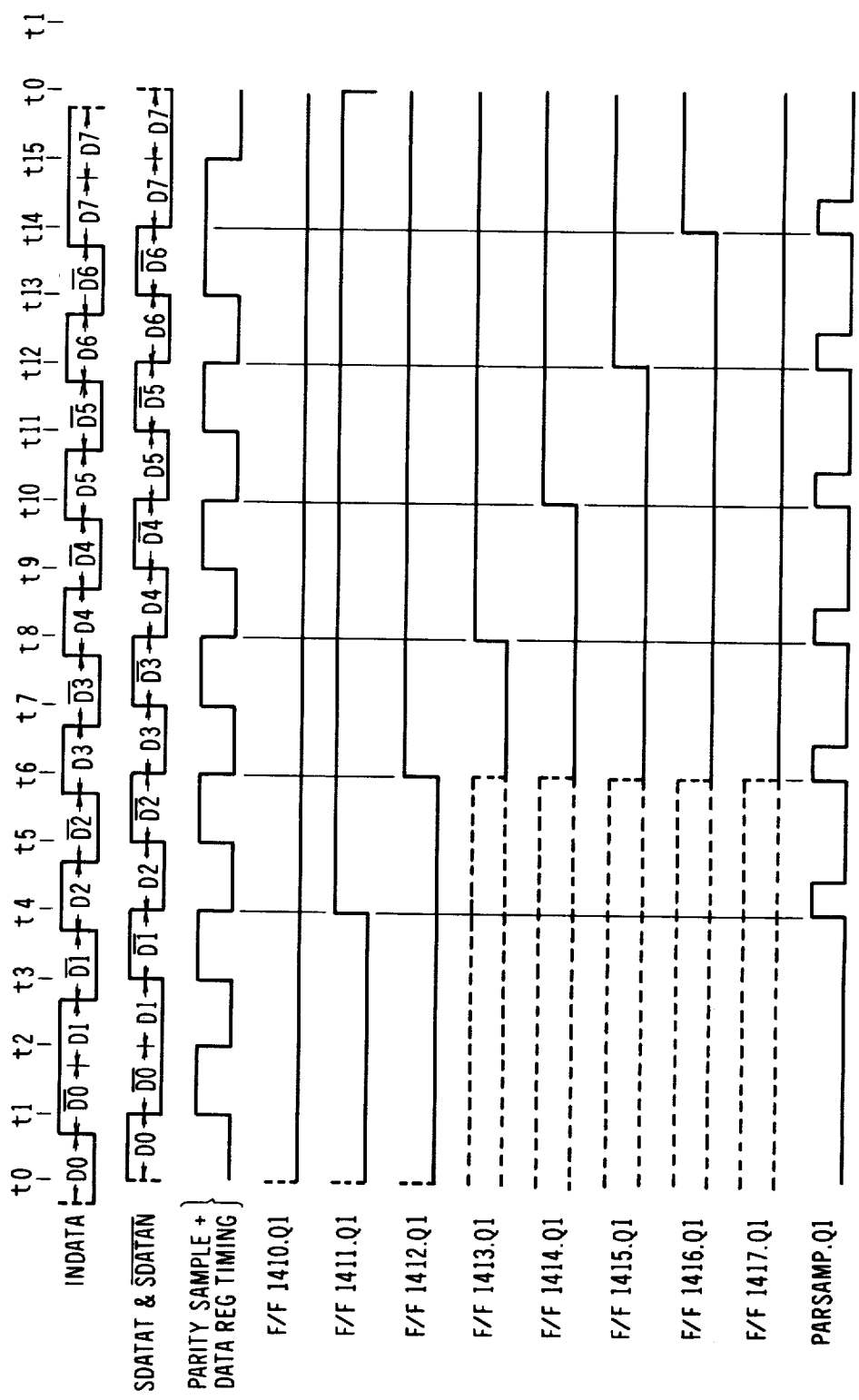

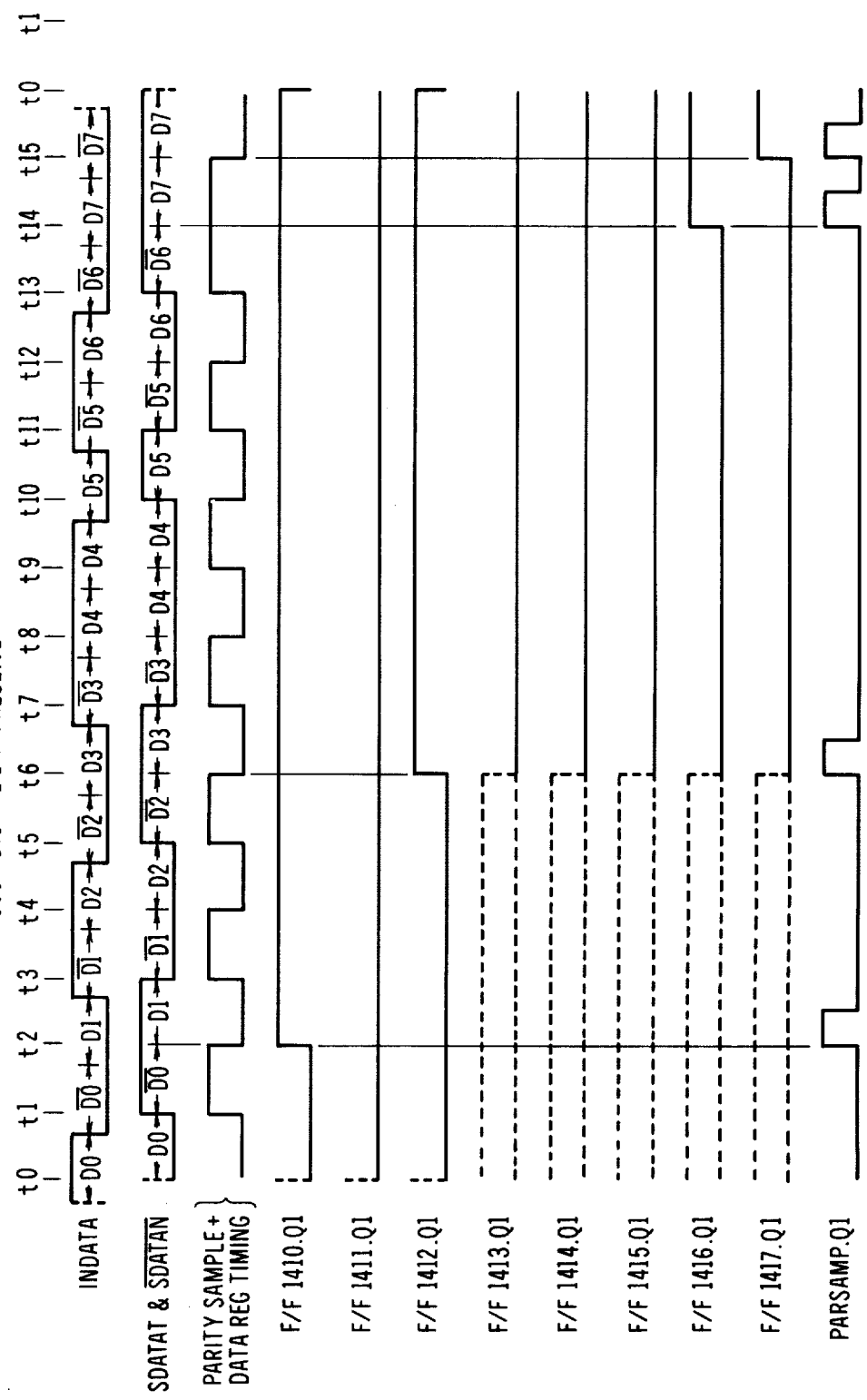

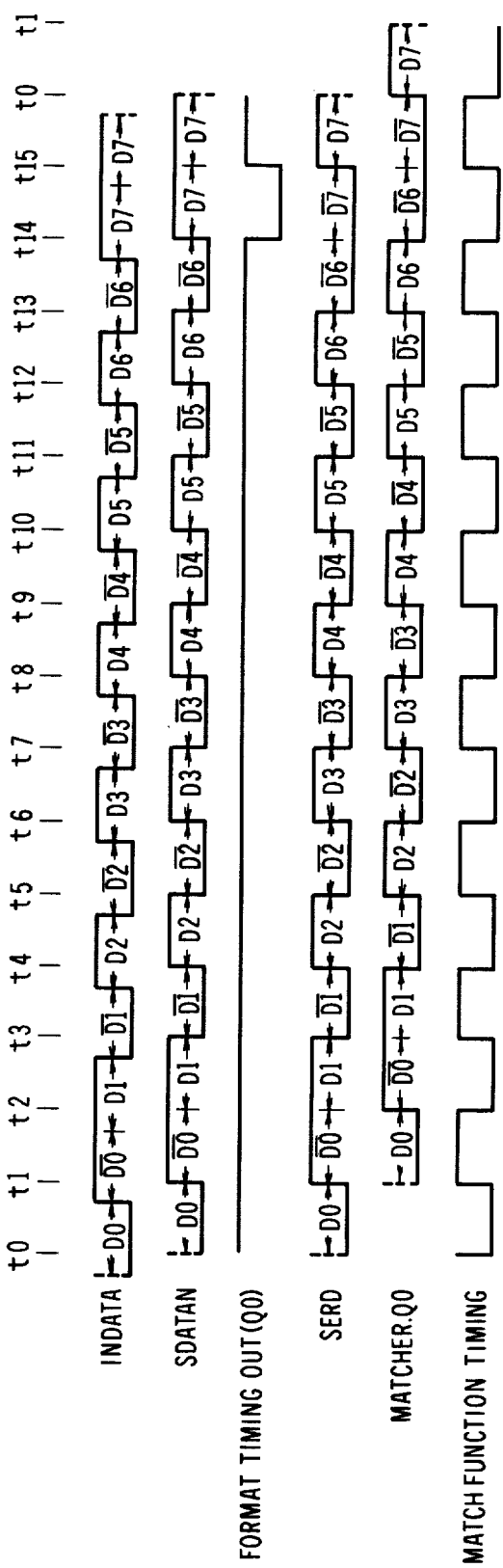

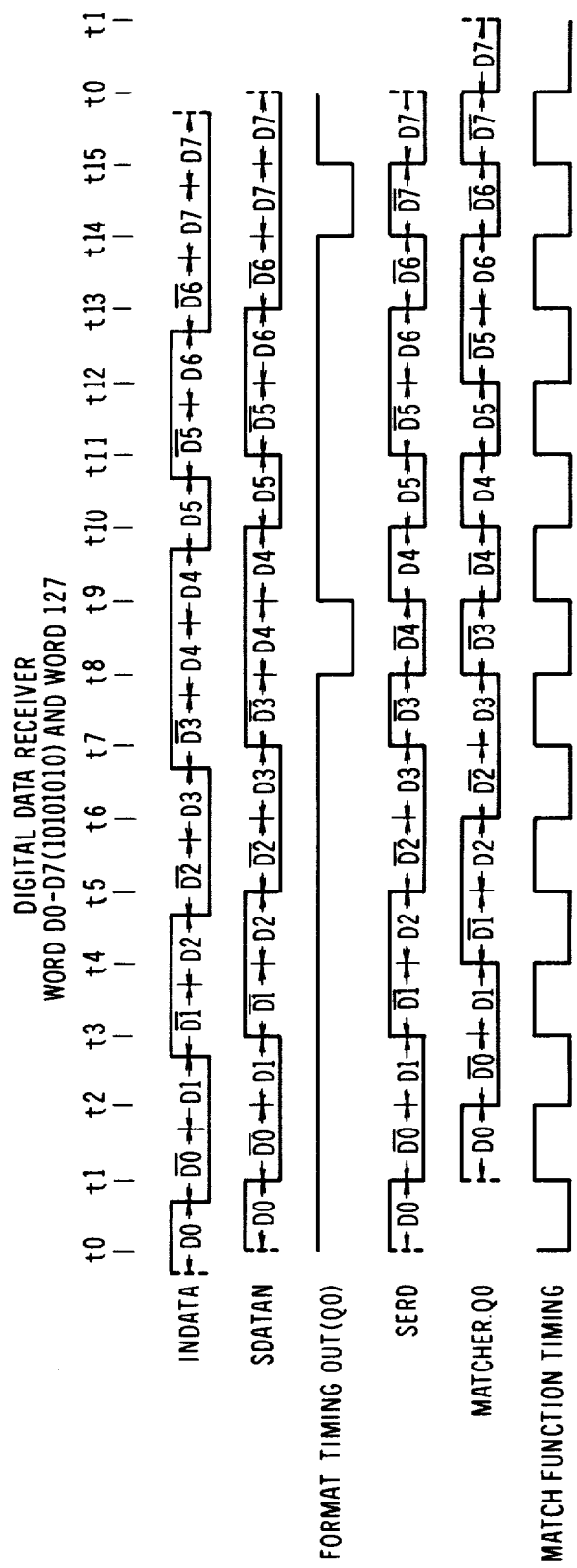

*FIG. 31*
DIGITAL DATA RECEIVER

| FIG. 15 | FIG. 16 | FIG. 18 |
|---------|---------|---------|
| FIG. 17 | FIG. 19 |         |

*FIG. 30*
DIGITAL DATA TRANSMITTER

| FIG. 6 | FIG. 7 | FIG. 8 |
|--------|--------|--------|
|        | FIG. 9 |        |

ARRANGEMENT FOR TRANSMITTING DIGITAL DATA AND SYNCHRONIZING INFORMATION

FIELD OF THE INVENTION

This invention relates to the transmission of serial digital data and associated synchronizing information.

BACKGROUND OF THE INVENTION

In digital processing systems there is a need for reliable means of transmitting data between processing entities. The transmission of data having a relatively slow repetition rate, e.g., 5 Khz, presents only minor problems, however, as the repetition rate of the data increases the problems of transmission and reception become greater. Additionally, where it is necessary to recover timing information from the data as it is received, it is essential that the serial data contain distinguishable synchronizing information. This implies that the bandwidth of the received message, comprising both data and synchronizing information, is greater than the bandwidth necessary to convey the information content of the data alone. Furthermore, in many applications of data transmission systems, it is essential that the integrity of the information content of the data message be maintained. It is common practice to insert error checking bits, e.g., parity information, in the serial data message so that the receiving apparatus can detect apparent errors in the received message content. The insertion of parity bits in a serial data stream further increases the bandwidth requirement of the transmission facilities.

SUMMARY OF THE INVENTION

In accordance with the invention, predetermined bit positions of each digital data word are utilized to transmit both data and synchronizing information while the remaining bit positions are used to transmit data only. Each digit in a "data only" bit position is transmitted as a first or second combination of the true and complement representations of that digit to convey a logical "0" or "1". Each digit in one of the bit positions predetermined to convey both data and synchronizing information is transmitted as a true representation of that digit. The synchronizing information is distinguishable from the data since the signals transmitted in those bit positions appear at the receiver as a violation of the normal coding plan.

Advantageously, the invention permits the transmission of both data and synchronizing information without the addition of separate synchronizing bits in a serial data stream. Furthermore, in accordance with the present invention, each data bit comprises two digit portions of equal time duration which can be utilized to detect apparent errors in the information digits transmitted. As an additional aspect of the invention, the true and complement digit representations are transmitted as bipolar signals resulting in a relatively stable DC condition which is independent of the data content on the transmission line.

In an illustrative embodiment of the invention, data words, each comprising eight digits, are serially transmitted to a receiver in recurring frames each comprising 128 time separated channels. Two digit portions are transmitted to represent each data word digit resulting in 16 digit portions per channel. The two digit portions representing data word digits which are to convey data only are transmitted as a true and complement representation of the data word digit. When employing an AC coupled transmission medium, each pair of "data only" digit portions is advantageously transmitted as a bipolar signal. In the present embodiment the eighth data word digit is predetermined to convey both data and channel synchronizing information. Accordingly, both digit portions representing the eighth digit are true representations of that digit. This violation of the generally complementary coding plan is detected by the receiver and utilized to maintain channel synchronism between the transmitter and receiver. Additionally, the fifth data word digit in the 128th channel of each frame is utilized to convey data and frame synchronizing information. The fifth digit of the first 127 data words per frame is transmitted as two complementary digit portions in accordance with the general coding format. The fifth digit of the 128th word is, however, transmitted as two true representations of that digit. This violation of the generally complementary coding format is detected by the receiver to maintain frame synchronism between the transmitter and receiver.

BRIEF DESCRIPTION OF THE DRAWING

FIGS. 10 through 13 are timing diagrams for portions of FIGS. 6 through 9;

FIG. 20 is a schematic diagram of a 2-bit register utilized in the drawing;

FIG. 21 is a schematic diagram of a gated delay flip-flop utilized in the drawing;

FIGS. 22 through 27 are timing diagrams illustrating the operation of the digital data receiver of FIGS. 15 through 19;

FIGS. 30 and 31 are key diagrams showing the organization of FIGS. 6 through 9 and 15 through 19, respectively.

GENERAL DESCRIPTION

Figure 1:
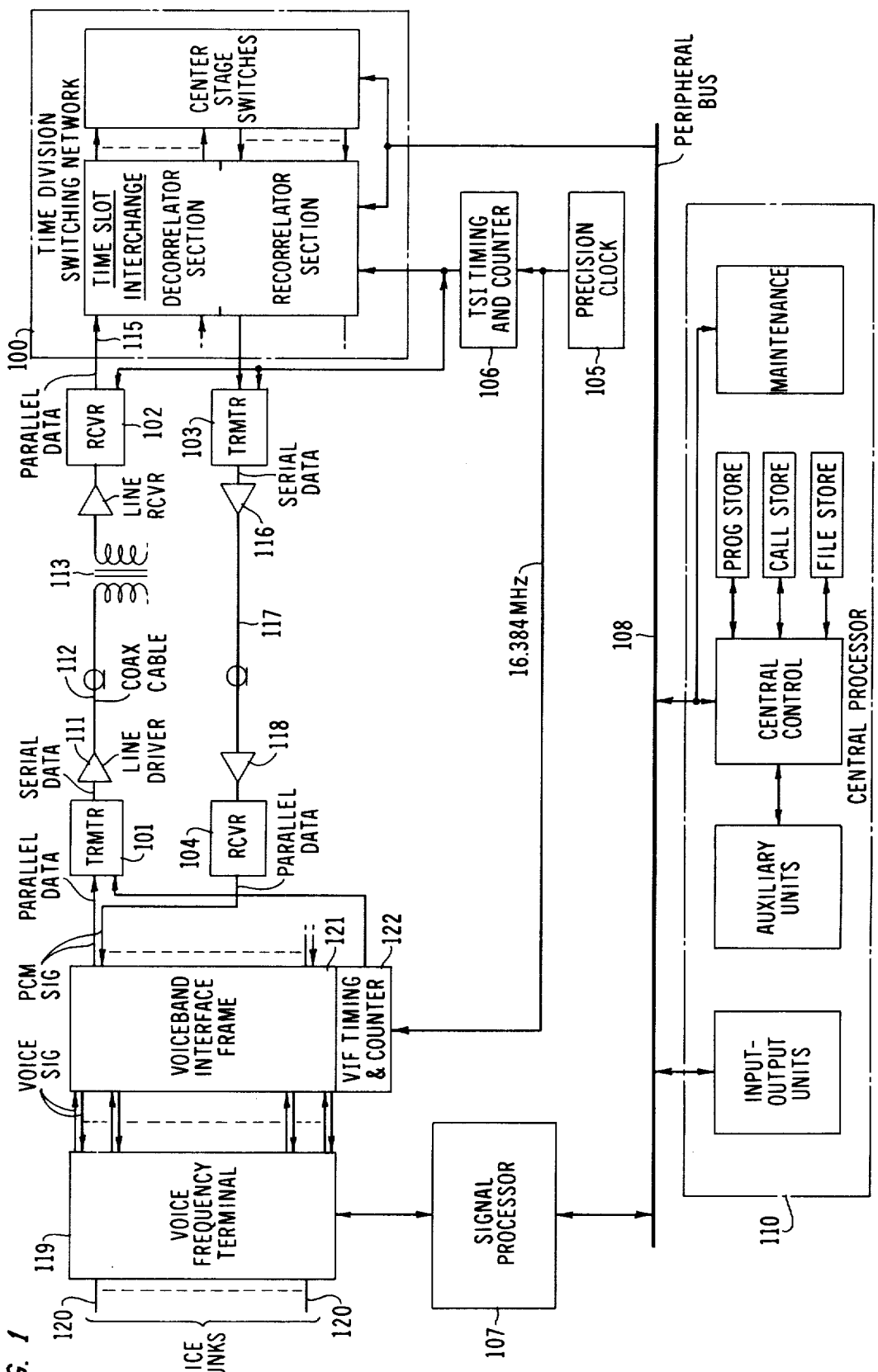
FIG. 1 is a schematic diagram of an environment in which the data transmission system is illustratively utilized.

FIG. 1 shows an illustrative environment in which the digital transmission system of the present invention is utilized. A voice frequency terminal 119 terminates a number of voice frequency trunks 120 which appear on individual circuits. A voiceband interface frame 121 encodes voice signals from the voice frequency terminal 119 into pulse code modulated (PCM) signals. A plurality of input digital transmission systems each comprising a digital data transmitter 101, a line driver 111, a coaxial cable 112, a receiver transformer 113, a receiving amplifier 114, and a digital receiver circuit 102, transmit the incoming PCM signals to a time-division switching network 100. Time-division switching network 100 interconnects the various channels of incoming PCM data to produce a plurality of outgoing PCM data channels. The outgoing PCM data is transmitted via one of a plurality of output digital data transmission systems to voiceband interface frame 121. The output digital data transmission systems each comprise a digital data transmitter 103, a line driver 116, a coaxial cable 117, a receiving amplifier 118, and a receiver 104. Since the operation of each of the input data transmission systems and each of the output transmission systems is substantially identical, only one of each is shown in FIG. 1 and described in detail herein.

Each digital data transmission system utilized in FIG. 1 serves to transmit 128 channels of PCM data. This PCM data is transmitted in a predominately bipolar coding format which is described later herein. Typically, the data processing entities, e.g., voiceband interface frame 121 and digital data receiver 102 are connected by a coaxial cable which may have lengths up to approximately 1,000 feet when utilized with line driver 111 and receiving amplifier 114.

A signal processor 107 is connected to voice frequency terminal 119 and detects service conditions, e.g., requests for service, on the voice frequency trunks 120. Information regarding these service conditions is transmitted to a central processor 110 which in response thereto generates control information for the time-division switching network 100. An understanding of the operation of central processor 110 is not essential to an understanding of the present invention, however, central processor 110 is utilized for processing and responding to service conditions and trouble signals which are generated by the various circuit arrangements of FIG. 1.

A precision clock 105 provides timing signals from which all of the system timing is derived. Output signals from the clock 105 are distributed to the voiceband interface frame 121, the digital data transmission systems and the time-division switching network 100. Timing derived from this common source results in frequency synchronism but not necessarily in phase synchronism between the voiceband interface frame 121 and the time-division switching network 100.

Voiceband interface frame 121 includes a timing and counter circuit 122 (FIG. 28) which in response to timing signals from precision clock 105, generates, among other signals, a recurring series of addresses 0 through 127. These addresses correspond to the 128 available channels on each digital transmission system between voiceband interface frame 121 and time-division switching network 100. In response to these addresses voiceband interface frame 121 encodes voice signals received from voice frequency terminal 119. During each encoding interval an 8-bit coded data word, and an associated parity bit are generated for each voice trunk. The resulting 9-bit digital codes representative of voice signals and parity are sequentially applied in parallel form, to digital data transmitter 101. Digital data transmitter 101 removes the parity bit and transmits each 8-bit digital word in an associated digital data channel to the digital data receiver 102 via the previously discussed input transmission system. Digital data transmitter 101 serially transmits each data word in a predominately bipolar format. In this format each transmitted data word bit is represented by two digit portions each occupying time of approximately 61 nanoseconds. Generally the first digit portion is a true representation of the corresponding data word bit while the second portion is the complement of the corresponding data word bit. Synchronizing information is conveyed by the bit stream from digital data transmitter 101 by variations in the bipolar coding format in predetermined bit positions of the data words. Both digit portions of the eighth bit (bit D7) of each data word transmitted are of the same true polarity making it a unipolar digit. That is, channel synchronism is conveyed by a variation of the bipolar format during transmission of bit D7 of each digital data word. Additionally, frame synchronizing information is conveyed by transmitting a true signal for both digit portions corresponding to the fifth data word bit (bit D4) during the 128th digital channel (channel 127) in each frame. The digital data receiver 102 extracts the synchronizing information from the incoming digital bit stream in a manner described in detail later herein.

Digital data transmitter 103 receives digital data words in parallel from the time-division switching network 100 and transmits these data words substantially as described for digital data transmitter 101 except that its control information is derived from TSI timing and counter circuit 106 rather than from the voiceband interface frame 121. Digital data receiver 104 responds to the time-multiplexed information in the manner of digital data receiver 102, however, it receives its control information from the data received from digital data transmitter 103.

Detailed Description

Two Bit Register (FIG. 20)

The illustrative digital data system may advantageously be constructed utilizing integrated semiconductor circuitry, however, the principles of this invention may be also practiced through the use of discrete components. In addition to standard gates and inverters, two other circuit building blocks are utilized in the detailed showing, e.g., in FIG. 6 through 9. These two building blocks are a 2-bit register circuit which is shown in gate level detail in FIG. 20 and the gated delay flip-flop which is shown in gate level detail in FIG. 21. The gates utilized throughout the detailed circuitry and in FIG. 20 and 21 are of a design such that the collectors of two or more gates may be tied directly together to produce an AND function.

The circuit of FIG. 20 comprises two register stages, termed the A stage and the B stage, which may be used independently of one another or may be used together in certain applications where common control thereof is advantageous. The A register stage of FIG. 20 comprises the A gate, the A' gate, the AFS gate, and the AG gate. Similarly, the B stage comprises the B gate, the B' gate, the BFS gate, and the BG gate. Each of these gates is an AND-NOT gate.

The signal levels at the input and output of these gates will be termed to be high to represent a "1" and low to represent a "0". When all of the input conductors of a gate are high the output of that gate is low. The A register stage of FIG. 20 is termed to be in the set or "1" state when the A1 output of the A gate is in the high state, and the A register stage is considered to be in the "0" or cleared state when the A0 output of the A' gate is high state. By convention, any control conductors which are not used in an application of the circuits of FIGS. 20 and 21 are held in the high state by internal connections of the circuit. This is important since in most applications of the 2-bit register and of the gated delay flip-flop not all of the control conductors are utilized.

A register stage, e.g., stage A of FIG. 20, may be set and cleared (reset) selectively by low signals on the conductors AS and AC, respectively. The A and B register stages may be cleared in common by a low going signal on the conductor C. Since these register stages are constructed of gates which may have their collector terminals tied together to perform an AND function, a "fast set" connection is utilized. In the A register the output or collector terminal of the gate AFS is connected directly to the A0 output conductor of the A' gate. This connection is termed the "fast set" connection since the register stage is set to the "1" state and since the state of the A0 conductor changes with a minimum time delay.

Gated Delay Flip-Flop (FIG. 21)

The gated flip-flop circuit of FIG. 21 comprises a cross-coupled pair of NAND gates, Q1 and Q0, and input and output gating circuitry. The flip-flop is termed to be in the "1" state when the output on conductor Q1 is high and is termed to be in the "0" state when the conductor Q0 is high. The NAND gates GQ1 and GQ0 under the control of gate signals on the conductor G01 and G00, respectively, serve to gate the outputs of the flip-flop to the conductors G1 and G0. Since the gates GQ1 and GQ0 are NAND gates, the signals on conductors G1 and G0 are the complements of the signals on conductors Q1 and Q0. The signals on the T conductor are control signals and a "0" to "1" transition is utilized to gate new information into the cell.

The conductors STL and CTL may be used to set and clear (reset) the flip-flop to the "1" and to the "0" state, respectively. A low signal on the conductor STL will cause the output on conductor Q1 to go to the high or "1" state of the flip-flop at times that the T input signal is in the low state. Similarly a low signal on the conductor CTL at times that the T input signal is in the low state will cause the conductor Q0 to go to the high state, which represents the "0" state of the flip-flop.

For the purpose of the following discussion it is assumed that the conductors STH0, Cl1, Cl2, CTH2, CTH1, D3, D2, and D1 are all in the high state. Under these conditions a "0" to "1" transition on the conductor T will cause the gate SG0 to conduct and this causes a low signal condition at the output of that gate and therefore at the input of the gate Q1. This low signal at the input of the gate Q1 serves to set the flip-flop to the "1" state wherein the conductor Q1 is in the high signal condition and the conductor Q0 is in a low signal condition. If one or more of the conductors D1, D2, and D3 is in the low state, then a "0" to "1" transition on the conductor T will cause the gate CG0 to be conductive and this causes a low signal condition at the output of that gate and at the input of the gate Q0 of the flip-flop. This low signal condition at the input of the gate Q0 causes a high signal condition on the conductor Q0 and a low signal condition on the conductor Q1. From the above discussion it can be seen that the signal condition on the conductor Q1 follows the signal condition on the conductors, D1, D2, and D3. That is, if at least one of the conducters D1, D2, and D3 is in the low or "0" state, the conductor Q1 will assume the same low signal state upon the occurrence of a "0" to "1" transition on the conductor T. Similarly, if the conductors D1, D2, D3 are all in the high signal state a "0" to "1" transition on the T conductor causes the Q1 conductor to go high. It should be noted that shortly after the beginning of a "0" to "1" transition on conductor T (in the order of 6 ns), subsequent changes in signal condition on the conductors D1, D2, and D3 will not be reflected in the state of the flip-flop.

Figures 28, 29:
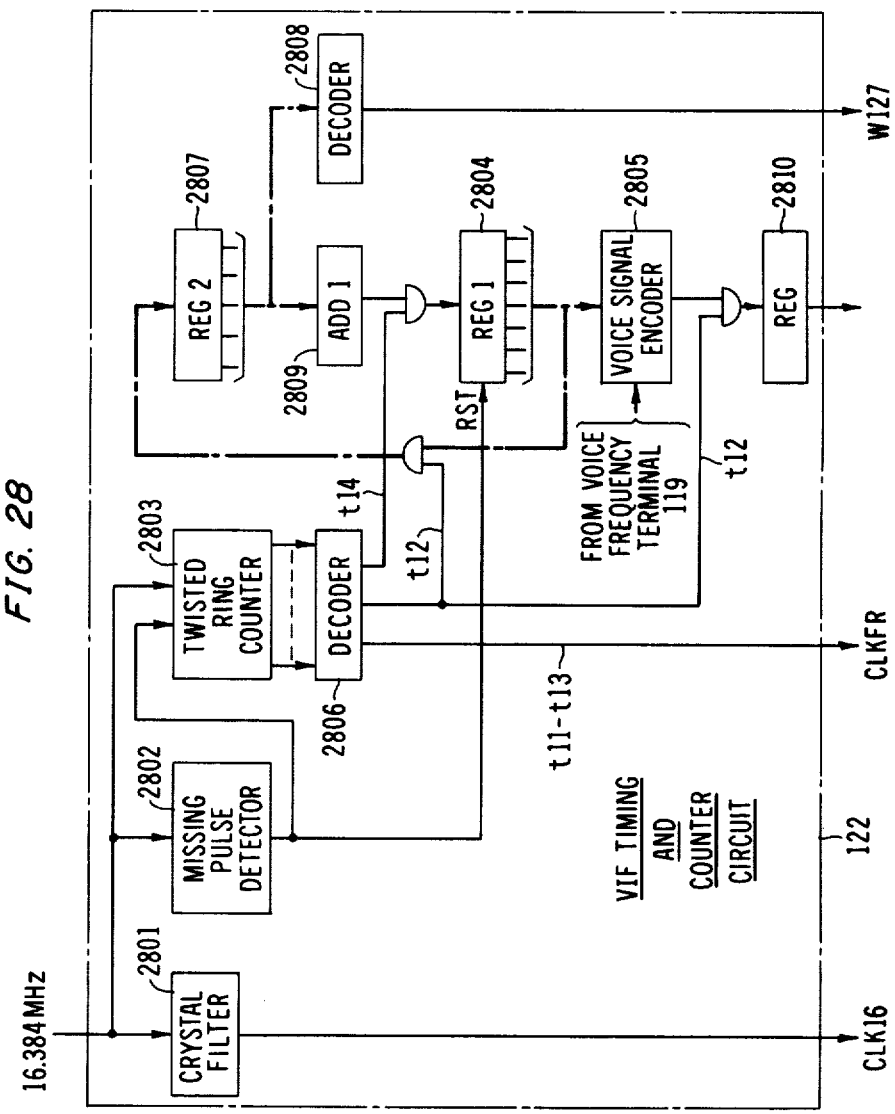
FIG. 28 is a block diagram of a control arrangement which provides control signals for the digital data transmitter of FIGS. 6 through 9.
FIG. 29 is a block diagram of an address counter utilized in conjunction with the digital data receiver of FIGS. 15 through 19.

VIF Timing and Counter Circuit (FIG. 28)

As previously stated, the basic source of timing information for the present system is precision clock 105 which generates a series of pulses at a 16.384 Mhz rate resulting in approximately 61 nonoseconds between the rising edges of successive pulses. Once every 2,048 clock pulses (125 microseconds), a pulse is missing from the output of clock 105. This "missing pulse" is used to maintain frame synchronization between the various system units. Sixteen clock pulses correspond to the approximately 976 nonosecond time period of a time-multiplexed channel. Additionally, data words each occupying the 976 nonosecond channel time are transmitted in recurring frames each comprising 128 channels, thus, exactly 2,048 (128 × 16) timing pulses occur per frame.

Figure 10:
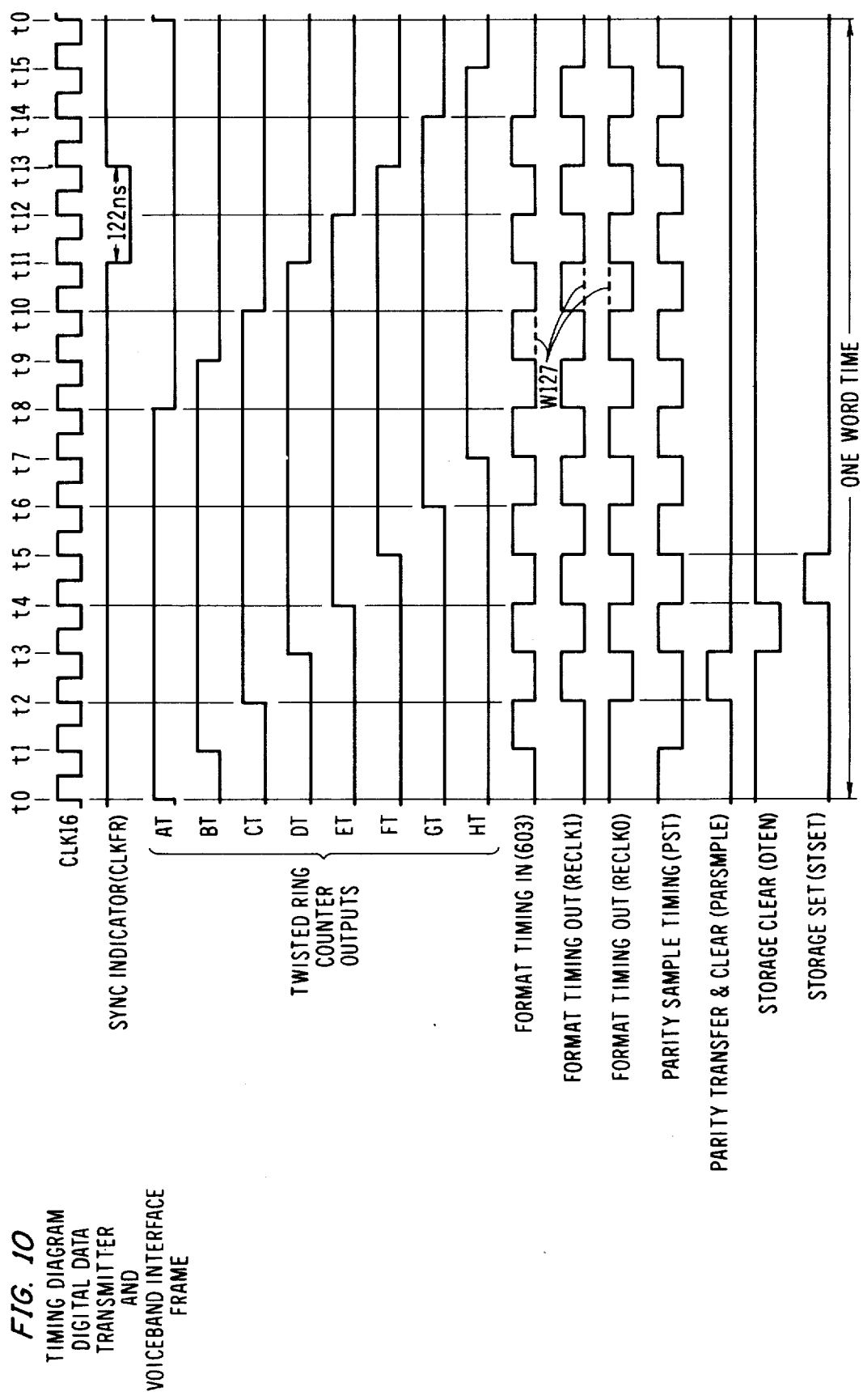

FIG. 10 is a graphic representation of the timing and control signals utilized in the voiceband interface frame 121 and the digital data transmitter 101. Most of the functions performed in the illustrative embodiment are performed in repetitive operating cycles of approximately 976 nonoseconds. The timing and control signals generated to produce an operating cycle start or stop at one of 16 basic times denoted $t_0$ through $t_{15}$ and shown in the top line of FIG. 10. For example, the signal AT (FIG. 10) becomes a logical "1" at $t_0$ which continues until $t_8$. In the course of the following description time intervals are referred to as $t_{a-b}$, where $a$ denotes the time the signal begins and $b$ denotes the time it ends. For example, the signal AT mentioned immediately above, is a logical "1" at time $t_{0-8}$.

Figure 2:
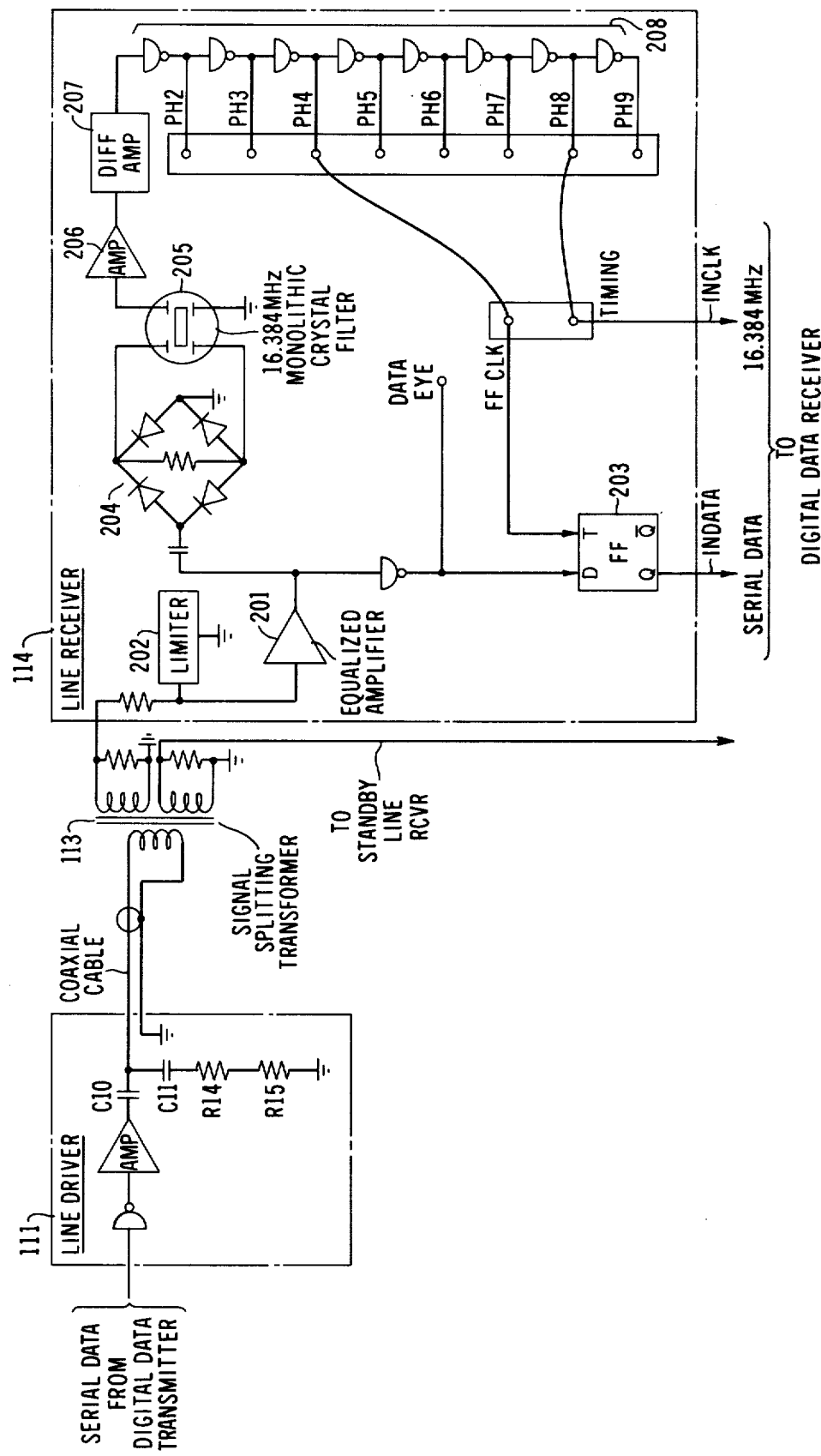
FIG. 2 is a schematic diagram of an illustrative transmission medium and portions of the subject data transmission system.

Voiceband interface frame 121 includes a voiceband interface frame (VIF) timing and counter circuit 122 which is shown in FIG. 28. VIF timing and counter circuit 122 obtains synchronism based on the missing pulse from precision clock 105, generates a recurring series of addresses 0 through 127 and transmits control signals to the digital data transmitter 101 to maintain synchronism therewith. The 16.384 Mhz timing signals from precision clock 105 are applied to a crystal filter 2801, a missing pulse detector 2802, and a twisted ring counter 2803. Crystal filter 2801, which is of the type described in detail later herein with respect to the line receiver 114 of FIG. 2, regenerates the 16.384 Mhz incoming clock signals and inserts a pulse in place of each missing pulse. The output signals CLK16 (FIG. 10) of crystal filter 2801 are transmitted to the digital data transmitter 101. Missing pulse detector 2802 detects missing pulses of the incoming clock signals from precision clock 105 and generates an output pulse at the time each missing pulse occurs. The pulse output of missing pulse detector 2802 is utilized to force VIF timing and counter circuit 122 into synchronism. The twisted ring counter 2803 comprises eight gated delay flip-flops of the type shown in FIG. 21 which are interconnected to count the incoming pulses from precision clock 105 and thereby provide the timing signals AT through HT shown in FIG. 10. Also generated but not specifically shown in FIG. 10, are timing signals AN through HN which are the complements of the respective ones of the signals AT through HT. The signals AT through HN are applied to a decoder 2806 which by logical combination of the signals AT through HT and AN through HN, generates timed control signal. These timed control signals are referred to herein by the times $t_0$ through $t_{15}$ at which they begin and end as previously described. For example, the logical AND of signals FT and EN produces a logical "1" at $t_{12-13}$.

In order to obtain and maintain synchronism between the twisted ring counter 2803 and precision clock 105, each pulse output of missing pulse detector 2802 forces twisted ring counter 2803 to generate the signals represented by AT through HT (FIG. 10) at time $t_0$. This defines time $t_0$. By counting the incoming clock signals, the outputs of twisted ring counter 2803 change as shown in FIG. 10 to maintain synchronism. VIF timing and counter circuit 122 also includes a pair of registers 2804 and 2807 and an add-one circuit 2809 which are interconnected to generate the recurring series of addresses 0 through 127. The contents of register 2804 which are applied to a voice signal encoder 2805 define the particular voice frequency line which is to have its signals encoded. At each occurrence of an output pulse from missing pulse detector 2802 register 2804 is forced to channel address zero. Synchronism is maintained between the occurrence of missing pulses by the address generation arrangement described later herein. By forcing the twisted ring counter 2803 to the states representing time $t_0$ and by forcing the contents of register 2804 to the address zero synchronism is obtained between VIF timing and counter circuit 122 and the timing signals from precision clock 105.

The contents of register 2804 are gated to register 2807 at time $t_{12-13}$ in response to a signal from decoder 2806. The outputs of register 2807 are applied to add-one circuit 2809 which increments them by one. At time $t_{14-15}$ the incremented outputs of add-one circuit 2809 are gated to register 2804. The above operations continue during each operating cycle resulting in the series of addresses 0 through 127 recurring once per frame.

As previously stated, encoder 2805 responds to the addresses contained by register 2804 by encoding into data words the analog signals on the incoming line defined by the contents of register 2804. These data words are gated at time $t_{12-13}$ to an output register 2810, the contents of which are directly applied in parallel to the digital data transmitter 101. In addition to the data words, timing and counter circuit 122 generates control signals W127 and CLKFR which are transmitted to digital data transmitter 101 to obtain and maintain synchronism therewith. Signal W127 is generated by a decoder 2808 when register 2807 stores the address 127. Signal CLKFR which is generated by decoder 2806 is a logical "0" at time $t_{11-13}$, as defined by the logical NAND of signals DN and FT of twisted ring counter 2803.

Digital Data Transmitter 101

Figure 5:
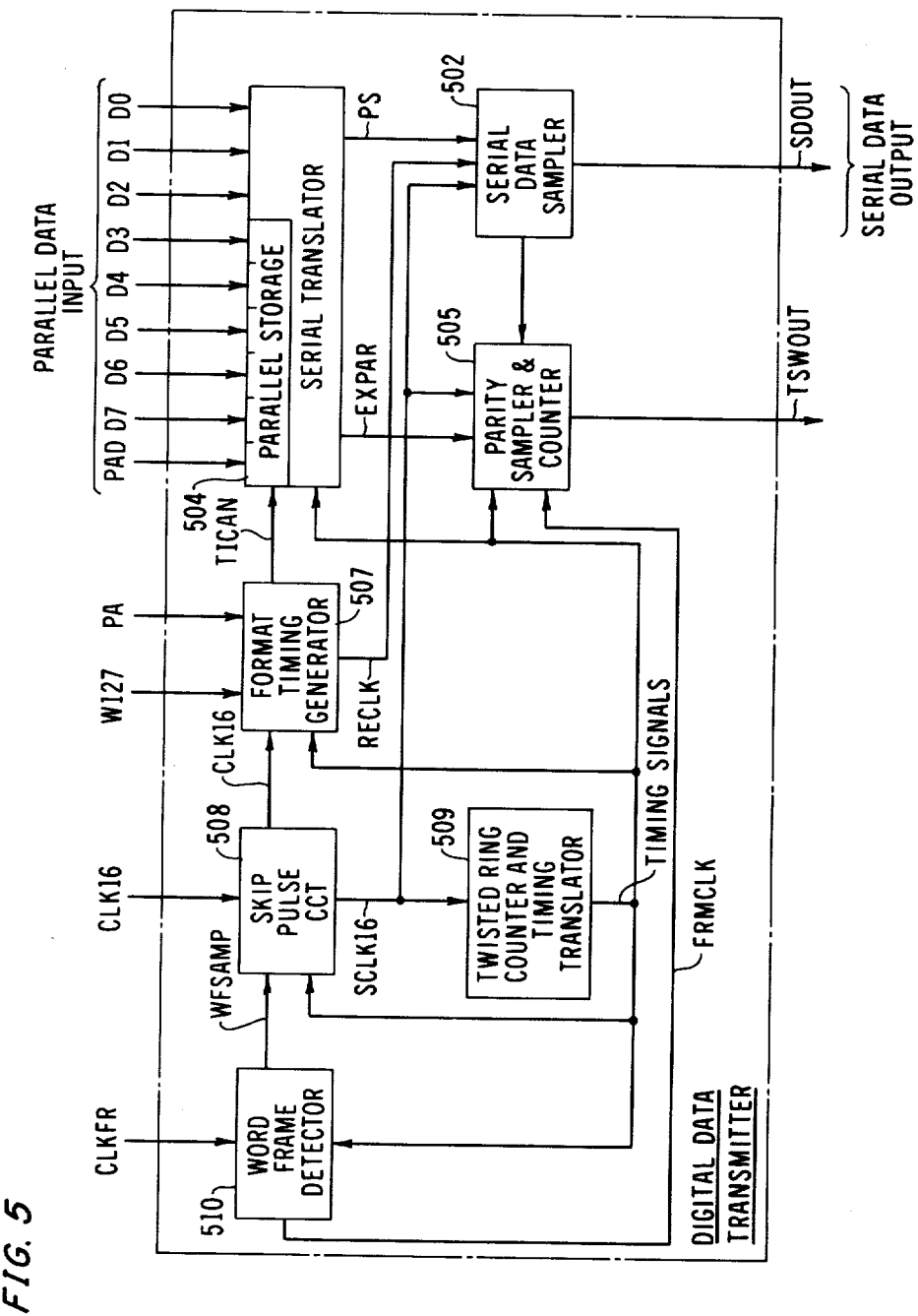
FIG. 5 is a block diagram of a data transmitter.
Figure 6:
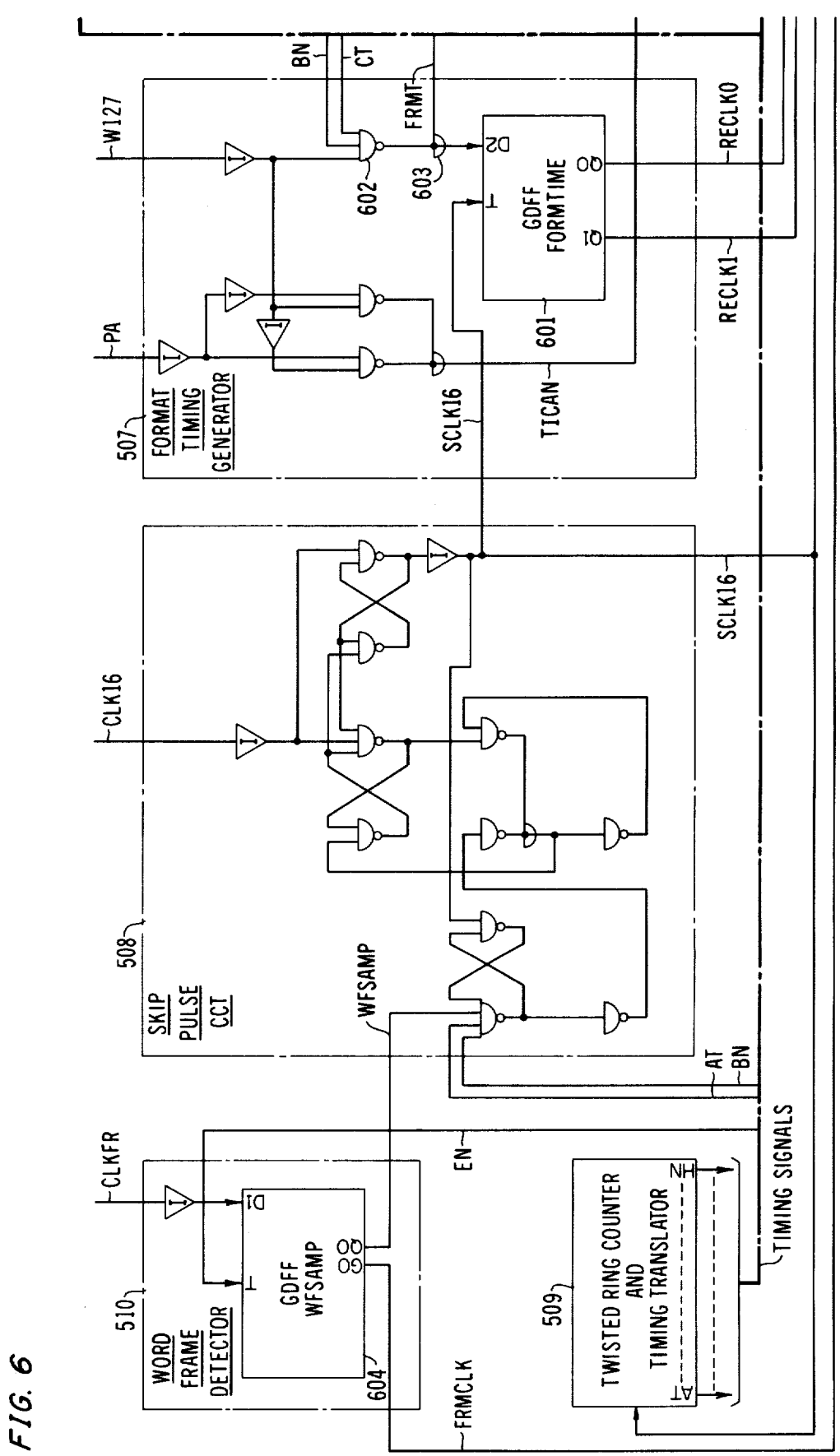
FIGS. 6 through 9, when organized as shown in FIG. 30, show the digital data transmitter in greater detail.
Figure 7:
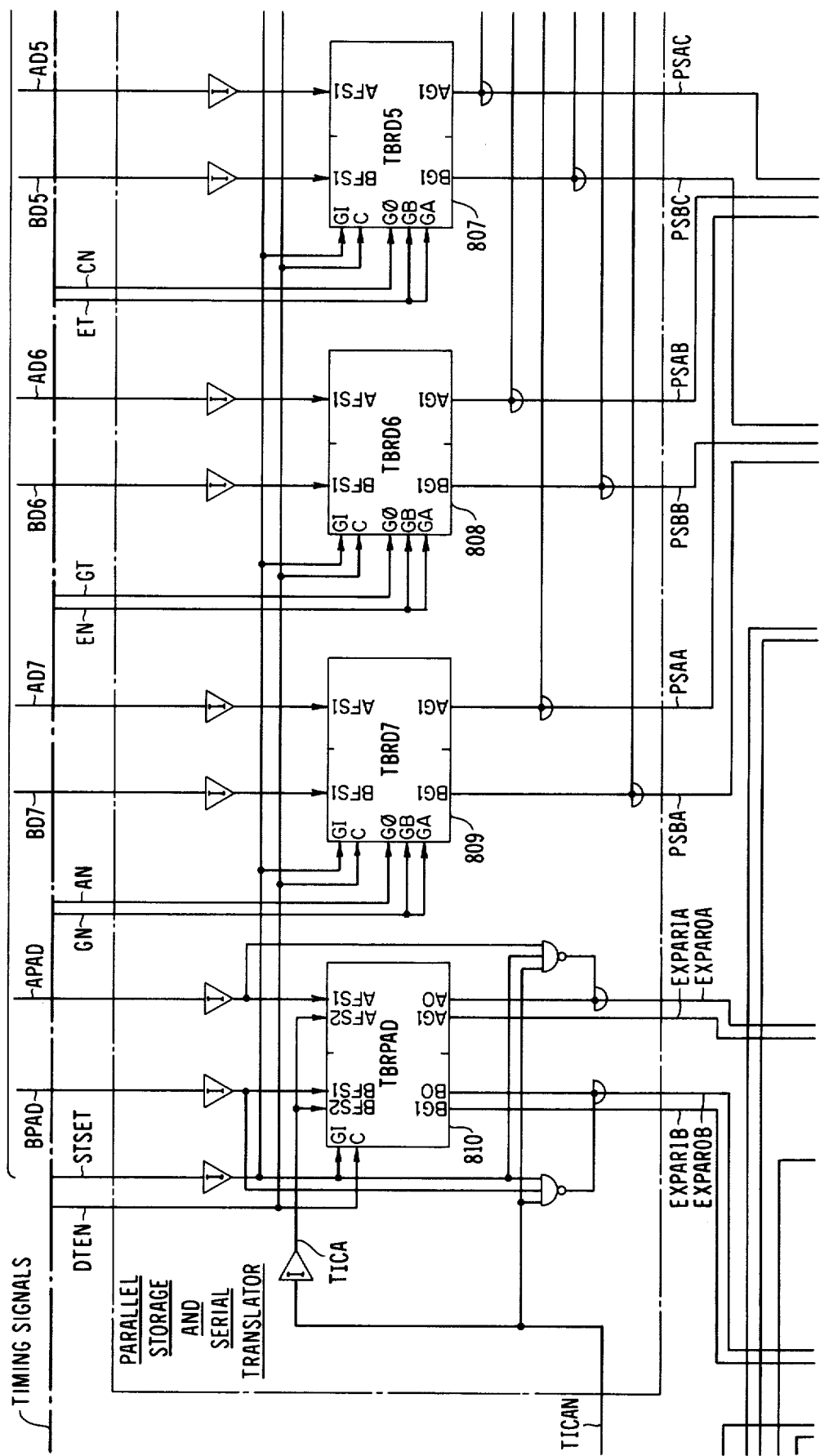
Figure 8:
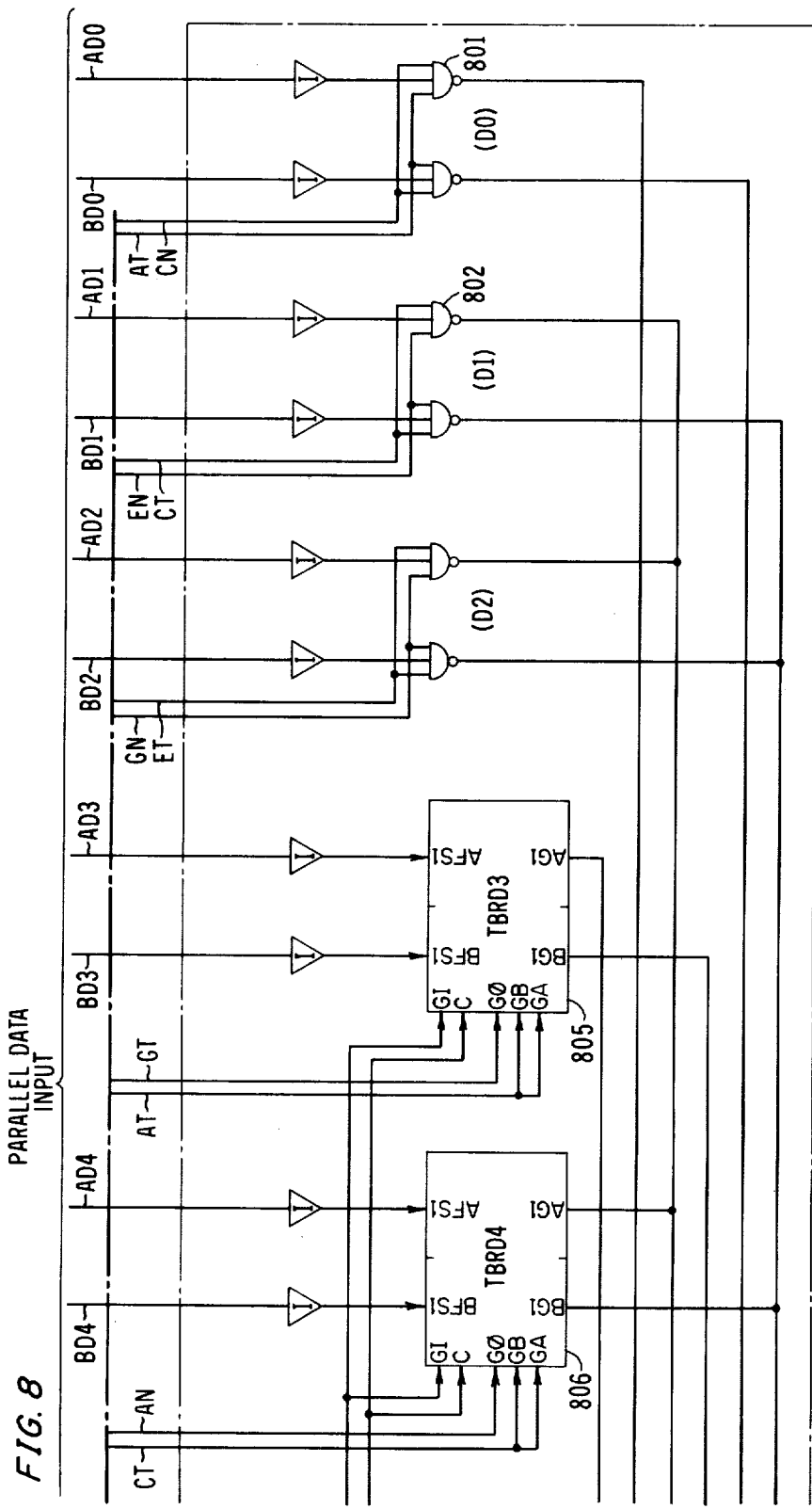

Digital data transmitter 101 which is shown in block diagram form in FIG. 5 and in greater detail in FIGS. 6 through 9, converts 8-bit parallel data words from register 2810 of voiceband interface frame 121 to the predominately bipolar serial data output words. The input data words to the digital data transmitter 101 comprise data bits D0 through D7 and a parity bit over the combination of the data and the identifying channel address of that data. The digital data transmitter 101 of FIGS. 6 through 9 is designed to transmit two independent output digital data streams on two independent output coaxial cables 112 to two independent digital data receivers 102 (FIG. 1). Accordingly, input conductors AD0, AD1....AD7 (FIGS. 7 and 8) correspond to input digits D0 through D7 of a word for a first digital data receiver 102 and inputs BD0, BD1....BD7 (FIGS. 7 and 8) correspond to the input digits D0 through D7 of a word for a second digital data receiver. These two digital words are converted to serial format independently and at substantially the same time. The timing and control signals are applied to them simultaneously and thus there is synchronism. In the course of the following example, the generation of only one of the digital data streams is described in detail.

Digital data transmitter 101 receives the clock signals CLK16 (FIG. 10) from crystal filter 2801 of the voiceband interface frame 121. CLK16 is transmitted to a twisted ring counter and timing translator 509 via a skip pulse circuit 508. The twisted ring counter and timing translator 509 comprises eight gated delay flip-flops of the type shown in FIG. 21, which are interconnected to provide the timing signals AT through HT shown in FIG. 10. Also generated but not specifically shown in FIG. 10, are gating signals AN through HN which are the complement of respective ones of the signals AT through HT. By logical combination of the signals AT through HT and AN through HN, timing control signals are generated for the system. For example, a NAND gate having a signal input, an input connected to AT and an input connected to CN will generate an output equal to the complement of the signal input during the time interval $t_{0-2}$.

Each input 8-bit digital data word and its associated parity bit are applied in parallel from register 2810 (FIG. 28) to the respective one of the inputs AD0 through AD7 and APD at time $t_{12-12}$. Generally stated, each digit of this data word is gated in sequence to a flip-flop 901 (FIG. 9) and stored thereby for approximately 122 nanoseconds (two timing intervals). Flip-flop 901 generates both the true and complement representation of each digit so stored. The particular digit representations to be transmitted from flip-flop 901 are selected by the state of a format flip-flop 601 (FIG. 6) as indicated by the signals RECLK1 and RECLK0.

At the occurrence of time period $t_{0-2}$, the input digit on conductor AD0 is gated by NAND gate 801 to gated delay flip-flop 901 via a conductor PSAB. A NAND gate 802 gates the signal on conductor AD1 to gated delay flip-flop 901 via conductor PSAA from time $t_{2-4}$. From time $t_{3-4}$ a pulse DTEN (FIG. 10) is applied to clear six 2-bit registers 805 through 810, which are of the type shown in FIG. 20. The registers 805 through 810 are used to store bits D3 through D7 and the parity digit of the two incoming digital words. The two storage sections of each 2-bit register are independent so that there is no combination of digits between the two digital data words. At time $t_{4-5}$ an input signal STET (FIG. 10) is applied to each of the 2-bit registers 805 through 810 which in response thereto store the inverse of the signal applied to inputs AD3 through AD7 and APAD. At time $t_{4-6}$ the inputs on conductor AD2 are gated to the gated delay flip-flop 901. The gating of the inputs AD3 through AD7 continues in this sequential manner resulting in the sequential application of each incoming data word digit to gated delay flip-flop 901. FIG. 11 (line PSAA+PSAB+PSAC) shows the digits applied to gated delay flip-flop 901 for an incoming word in which 01111111 represents digits AD0 through AD7 respectively. The toggle input of gated delay flip-flop 901 is connected to conductor SCLK16 which during synchronism is a regeneration of the signal CLK16. Gated delay flip-flop 901 stores the signal at its D inputs (in accordance with the description of FIG. 21) at the rising edge of each pulse of SCLK16. Thus, gated delay flip-flop 901 stores digits D0 through D7 in sequence as shown in FIG. 11.

Digital Data Transmitter Format Control

Format timing generator 507 (FIG. 5 and FIG. 6) controls the conversion of the contents of gated delay flip-flop 901 to the predominantly bipolar format by selecting the true or complement representation of the contents of flip-flop 901 for transmission. The D input terminal of a gated delay flip-flop 601 included in the format timing generator 507 receives as input signals the logical AND (603) of a signal FRMT (FIG. 10) from twisted ring counter and timing translator 509 and the output signals of NAND gate 602. The output of wired AND gate 603 is denoted Format Timing In (603) of FIG. 10. The dashed line, labeled W127 of the Format Timing In signals (FIG. 10) indicates that the pulse occurring from time $t_{9-10}$ is deleted during word 127. This deletion, which is described in greater detail later herein, is caused by the operation of NAND gate 602.

Figure 9:
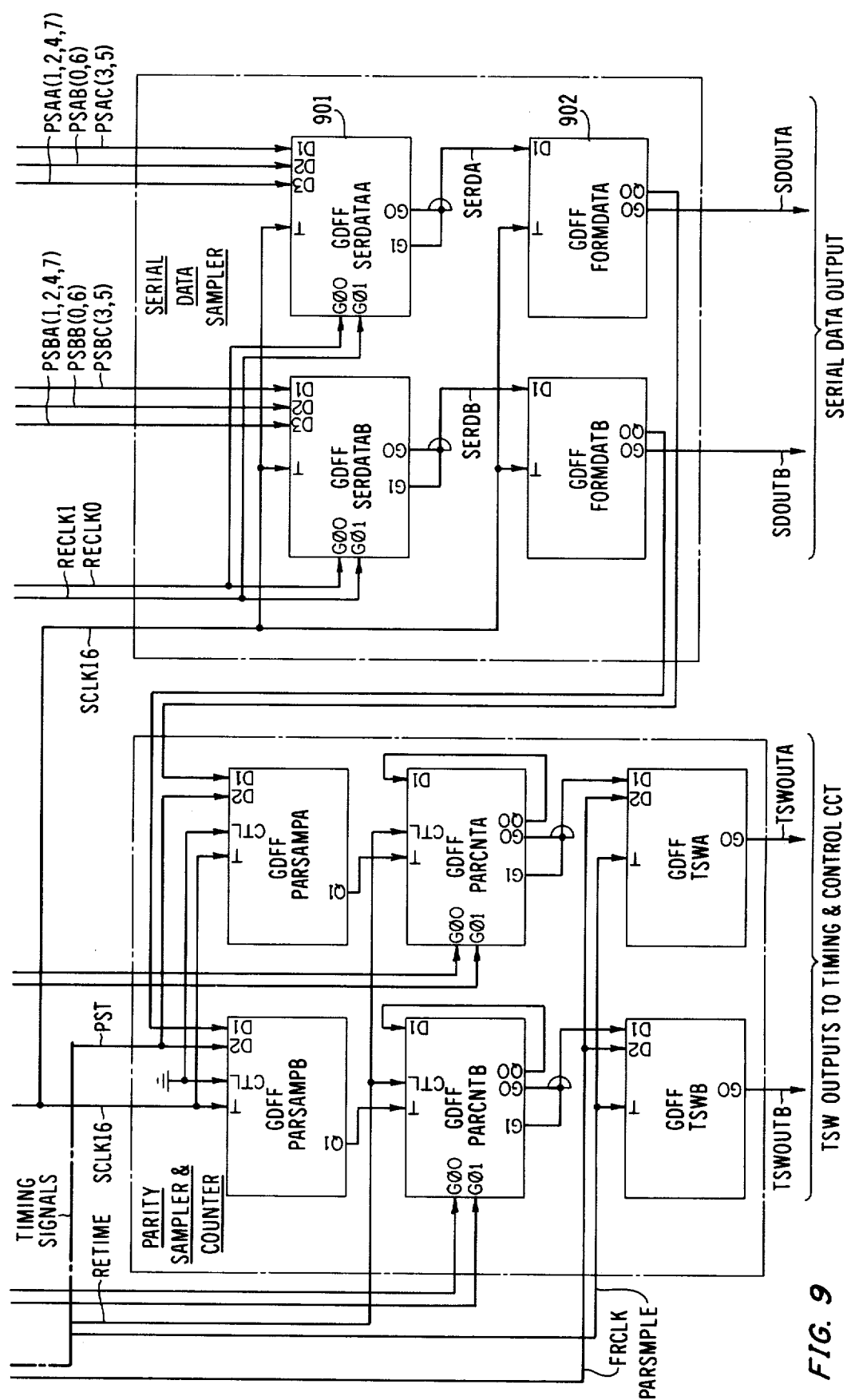

The toggle input terminal of gated delay flip-flop 601 receives the timing signals SCLK16 and, in response to the toggle and control inputs (FIG. 10), generates the complementary outputs RECLK1 and RECLK0 (FIG. 10). The signals RECLK1 and RECLK0 are transmitted to respective ones of the gating inputs G0 and G1 of flip-flop 901 (FIG. 9). In accordance with the description of the gated delay flip-flop shown in FIG. 21, a logical "0" RECLK1 and its corresponding logical "1" on conductor RECLK0 gate the true signal stored by gated delay flip-flop 901 on output SERDA while a logical "1" on conductor RECLK1 and its complement "0" on RECLK0 gate the complement of the signal stored in gated delay flip-flop 901 to conductor SERDA. The outputs SERDA are applied to the input of another gated delay flip-flop 902 for an additional stage of buffering and shaping prior to final output transmission. Additionally since the signals RECLK1 and RECLK0 can change each 61 nanoseconds, (one clock time interval) two digit portions 61 nanoseconds each can be transmitted to represent each data word digit.

The description of the format generation is in two parts. First described is the operation regarding an incoming data word 01111111 which is not word 127. The second description regards the operation involved for the data word 10101010 which is applied to digital data transmitter 101 as word 127. This distinction is drawn since the coding format of the present invention is varied during word 127 to convey frame synchronization. FIG. 11 represents the output gating in accordance with the first example as described above. The data word digits are serially gated to flip-flop 901 as shown in FIG. 11 (F/F 901,Q1). The signals RECLK1 (FIG. 11) are applied to the gating terminal G0 of flip-flop 901 and signals RECLK0 (not shown) are applied to the gating terminal G1 of that flip-flop. In response to these data and control inputs, the output SERDA of flip-flop 901 is as shown in FIG. 11. It should be noted that due to the logical "0" RECLK1 from time $t_{15-2}$, a true representation of bit D7 is transmitted during both digit portions for all data words. Two true digit portions D7 are transmitted to obtain channel synchronism between digital data transmitter 101 and digital data receiver 102.

The following is a description of the operation regarding word 127 in which bits D0 through D7 are 10101010 respectively, which is represented in FIG. 12. As previously stated, decoder 2808 of voiceband interface frame 121 generates a logical "0" signal W127 while register 2807 contains the address 127. This logical "0" signal, W127, is inverted and applied to NAND gate 602 of the format timing generator 507. In response to the timing inputs CT and BN from twisted ring counter and timing translator 509 the output of NAND gate 602 at time $t_{9-10}$ during word 127 becomes a logical "0". This logical "0" when ANDed by node 603 with the signal FRMT deletes the logical "1" input to flip-flop 601 from time $t_{9-10}$. Accordingly, the output RECLK1 (FIG. 12) is a logical "0" from $t_{10-11}$ when it would otherwise be a logical "1" (see FIG. 11). The logical "0" on RECLK1 from time $t_{10-11}$ is applied to the gating inputs of gated delay flip-flop 901 and gates the coupled D4D4 on its output SERDA (FIG. 12) rather than D4 and its complement $\overline{D4}$. The transmission of two true D4 bits during word 127 is used to convey frame synchronizing information to the digital data receiver 102.

The digital data transmitter 101 also includes a parity sampler and counter 505 which is responsive to the incoming parity over address and data and the incoming signal PA which represents parity over the address to determine if the parity of the received data is correct. In the case this parity is incorrect, a signal TSWOUTA or TSWOUTB is generated.

DIGITAL DATA TRANSMITTER SYNCHRONIZATION

It is necessary while initializing the system to obtain synchronism between the voiceband interface frame 121 and digital data transmitter 101. Synchronism is obtained by the skip pulse circuit 508 as controlled by word frame detector 510 and control signal CLKFR from VIF counter circuit 2803. Synchronism exists when the time $t_{12}$, as defined by twisted ring counter and timing translator 509, occurs during the time period $t_{11-13}$ as defined by the twisted ring counter 2803 of the voiceband interface frame 121. To this end decoder 2806 (FIG. 28) of the voiceband interface frame 121 generates the signal CLKFR (FIG. 10) which is a logical "0" at time $t_{11-13}$ as defined by twisted ring counter 2803. Signal CLKFR is inverted and applied to the D input of a gated delay flip-flop 604. The T input of gated delay flip-flop 604 is the output EN of twisted ring counter and timing translator 509 and the rising edge of signal EN occurs at time $t_{12}$ as defined by twisted ring counter and timing translator 509. So long as the signal EN goes positive while the input CLKFR is a logical "0" (the D input to gated delay flip-flop 604 is a logical "1") synchronism exists. However, if the positive transition of a signal EN occurs while signal CLKFR is a logical "1" (the D input to gated delay flip-flop 604 is a logical "0"), the lack of synchronism is indicated by a logical "1" at the Q0 output of gated delay flip-flop 604. This logical "1" which is referred to as signal WFSAMP is used to control skip pulse circuit 508 during time interval $t_{0-1}$ (as defined by signal AT and BN) to skip one of the pulses on the incoming bit stream CLK16.

FIG. 13, which represents an example of how synchronism is established, shows the timing pulses (16.384 Mhz clk in VIF) employed in the voiceband interface frame 121 to generate the signal CLKFR. The timing designations $t_{15}$ etc., immediately above 16.384 Mhz clk in VIF (FIG. 13) denote the significance of each clock pulse within the voiceband interface frame. The signal CLKFR as defined by twisted ring counter 2803 is a logical "0" from time $t_{11-13}$. FIG. 13 also shows the signal SCLK16 which is used to control digital data transmitter 101. The timing designations $t_0$ etc., immediately above SCLK16 (FIG. 13) denote the significance of each timing pulse within transmitter 101. This significance is defined by twisted ring counter and timing translator 509. The left half of FIG. 13 shows a nonsynchronous condition wherein the precision clock pulses of the VIF do not denote the same time as the corresponding pulses SCLK16 of the digital data transmitter 101. The lack of synchronism is detected by gated delay flip-flop 604 of word frame detector 510 at time $t_{12}$ (as defined by twisted ring counter 509 of the digital data transmitter 101), since the rising edge of EN corresponds to a logical "1" CLKFR. Gated delay flip-flop 604 thus generates the signal WSFAMP which controls skip pulse circuit 508 to skip the pulse corresponding to the pulse $t_1$ from the VIF. After this pulse is skipped, the designations of the two sequences of clock pulses are substantially identical. At the next rising edge of EN which, as shown, occurs during a logical "0" on the input CLKFR no pulse is skipped indicating synchronized operation. If the voiceband interface frame 121 and the digital data transmitter 101 are more than one pulse out of synchronism, one pulse out of each sixteen will be skipped, as above described, until synchronism is attained.

LINE DRIVER AND RECEIVER CIRCUITS (FIG. 2)

Figure 3:
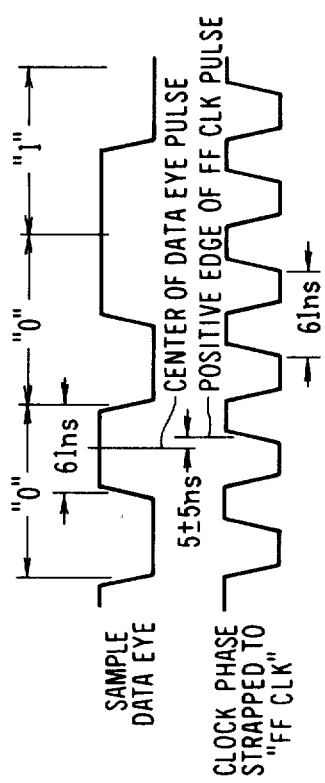
FIGS. 3 and 4 are timing diagrams illustrating timing within the line receiver of FIG. 2.
Figure 4:
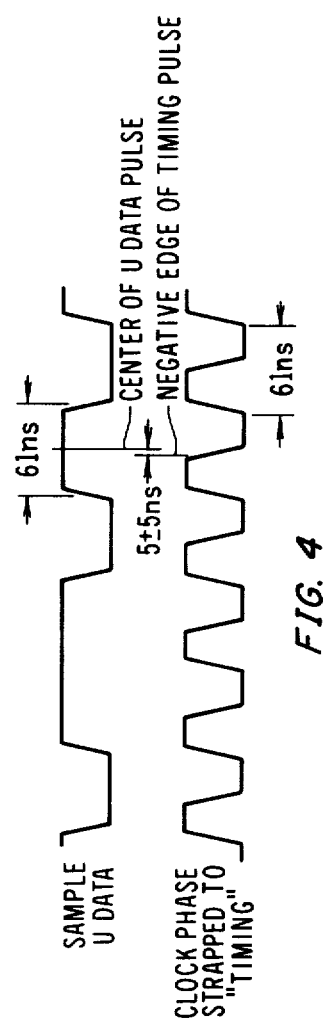

The operation of digital data transmitter 101 results in a recurring series of serially transmitted data channels. These channels are transmitted to a line driver 111 (FIG. 2) which retransmits them on the AC coupled medium comprising coaxial cable 112 and transformer 113. Line receiver 114 receives the serial data stream via a connection to transformer 113. The incoming data stream is applied to the input of an operational amplifier 201. A limiter circuit 202 clamps the input to operational amplifier 201 to a fixed level so that all of the outputs of operational amplifier 201 will be within predefined limits. Operational amplifier 201 contains an equalizer circuit to compensate for the varying attenuation versus frequency response of the transmission arrangement. The output of operational amplifier 201 (upper portion of FIG. 3) is a regenerated bit stream which represents the data transmitted from digital data transmitter 101 and is applied to the D input of a toggle flip-flop 203.

The output of operational amplifier 201 is also applied to a diode circuit 204, the outputs of which drive a 16.384 Mhz crystal 205. The output of crystal 205 is a sinusoidal wave form of 16.384 Mhz frequency which is amplified by an operational amplifier 206 and level shifted by a differential amplifier 207. The output of differential amplifier 207 is in turn applied to a NAND gate chain 208, which produces eight different phases of square wave series having a frequency of 16.384 Mhz. A first output of gate chain 208 is taken from the third gate and applied to the toggle input of toggle flip-flop 203. This arrangement synchronizes timing and further "squares" the received data signal.

Digital Data Receiver Data Reception

Figure 14:
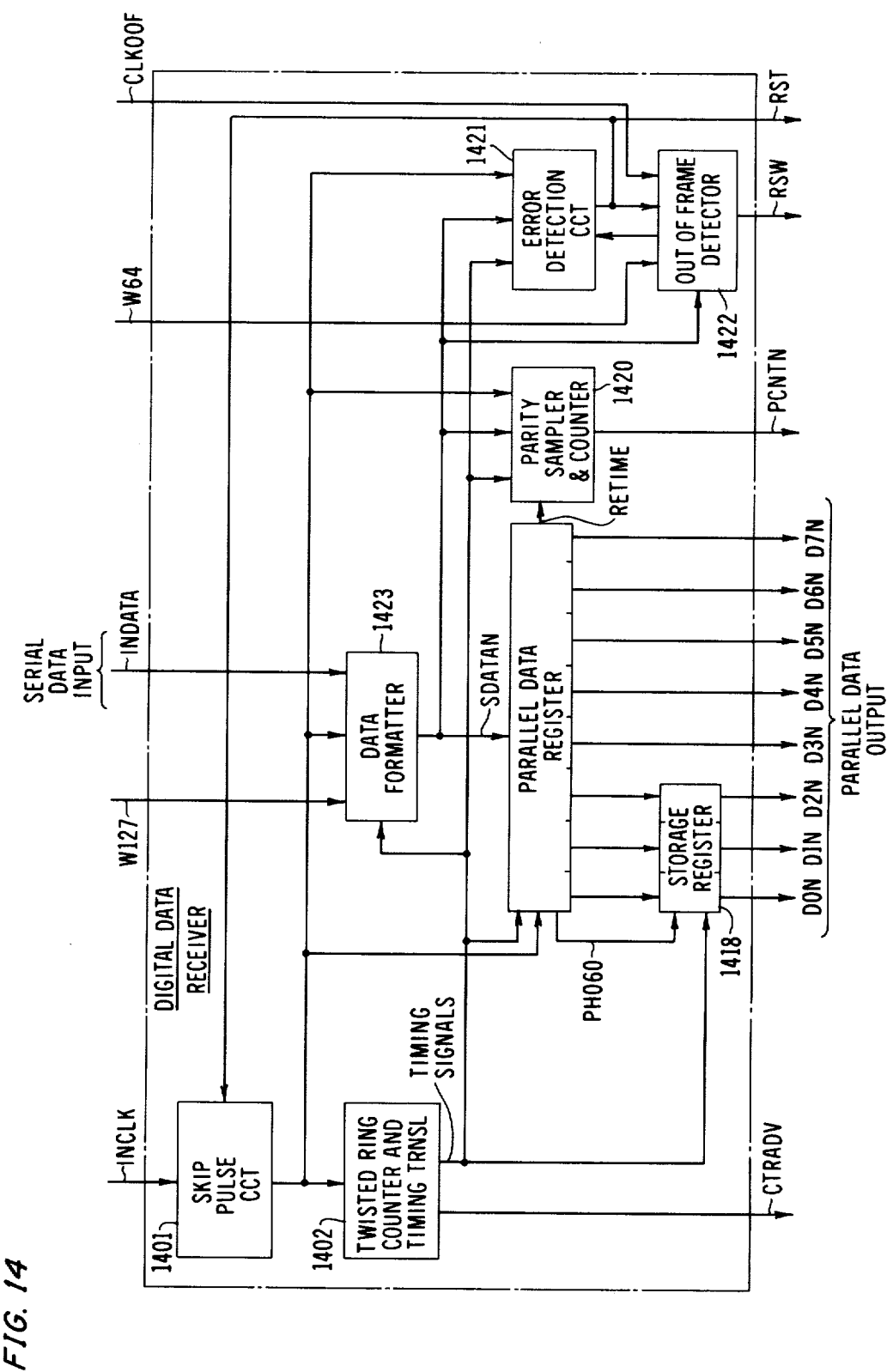
FIG. 14 is a block diagram of a digital data receiver circuit.
Figure 15:
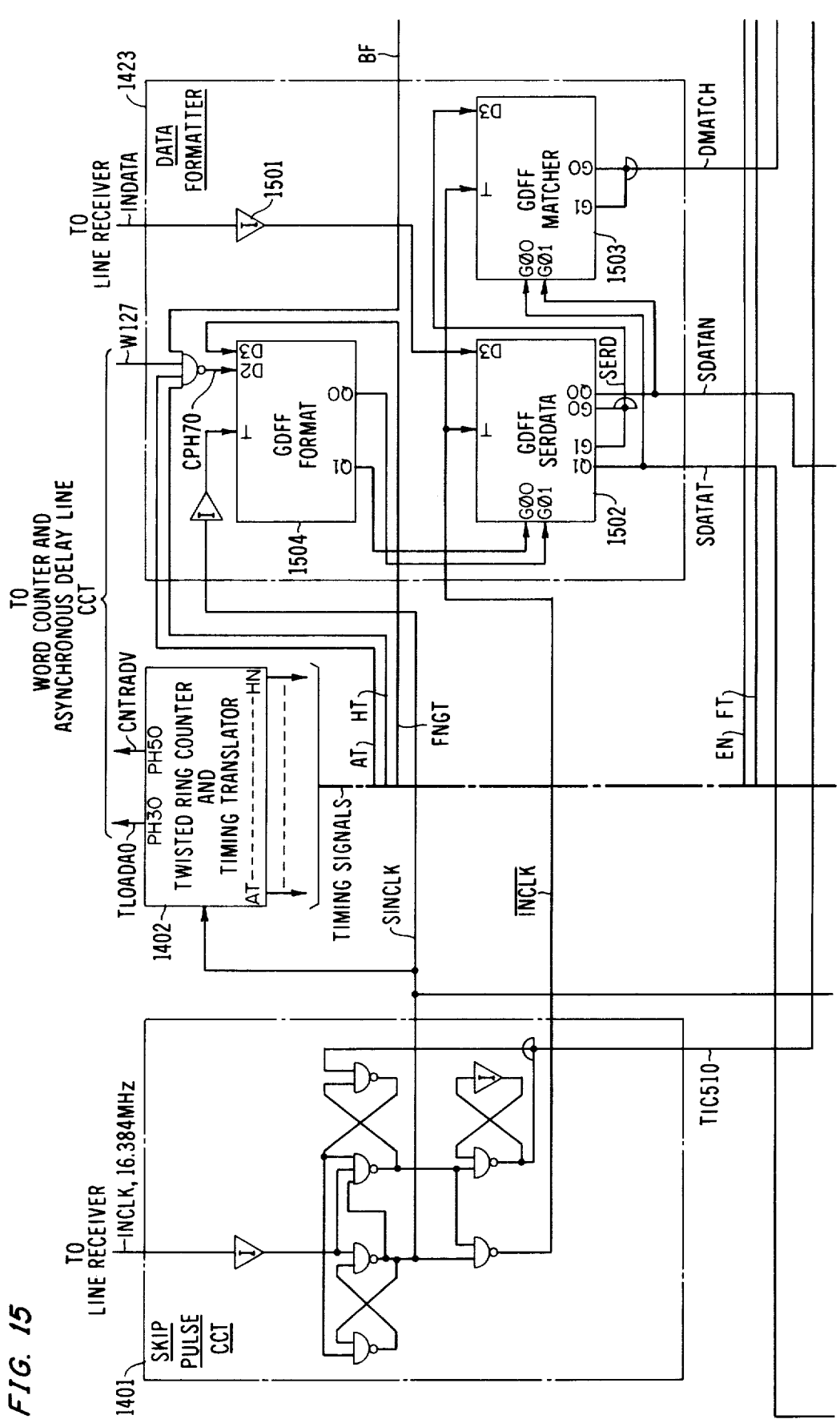
FIGS. 15 through 19, when arranged as shown in FIG. 31, show the digital data receiver circuit in greater detail.
Figure 22:
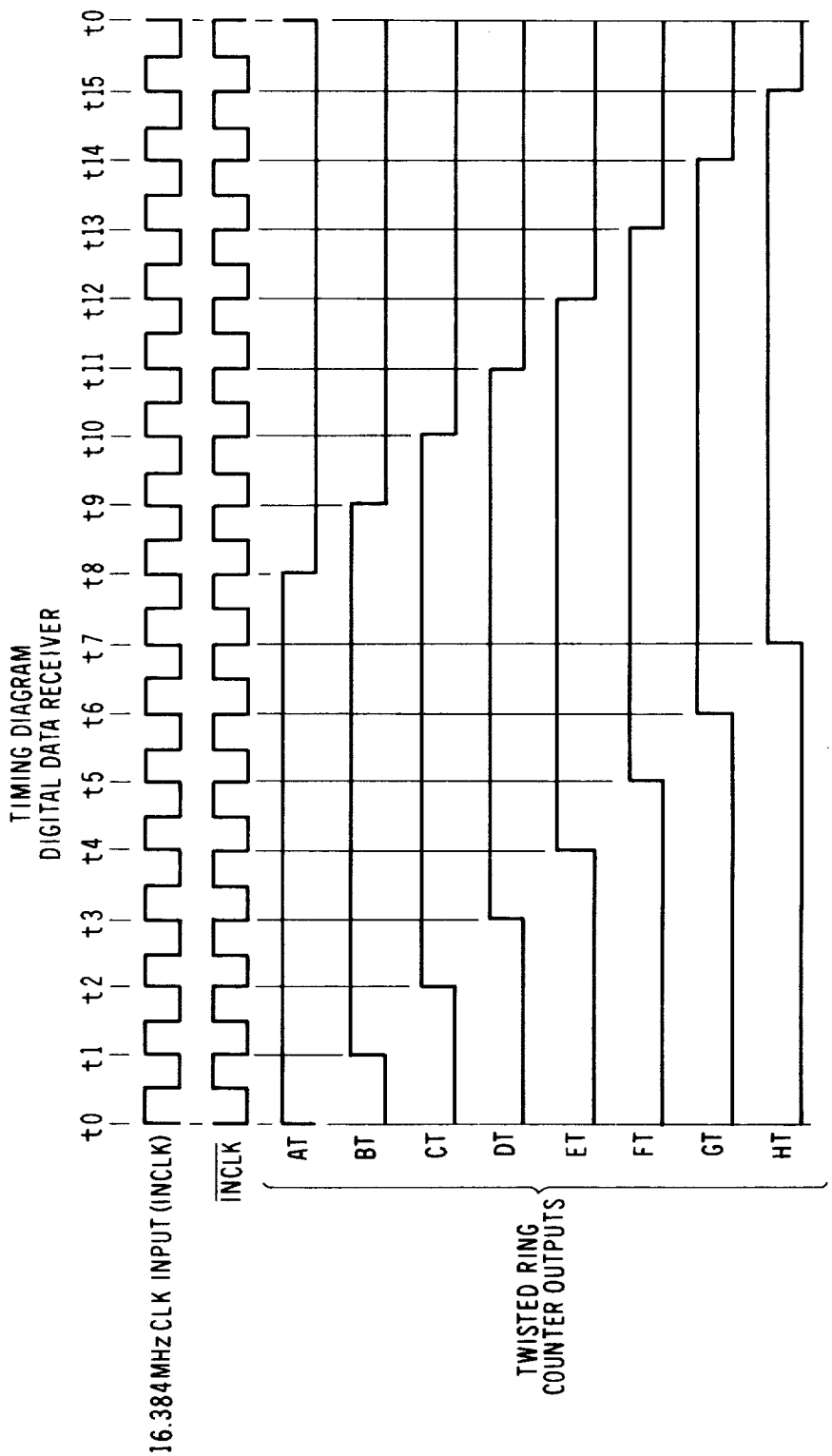

The output of the seventh of the chain of NAND gates 208 is a clock signal INCLK (FIG. 22, line 1) and is used to control the digital data receiver circuit 102. The digital data output of toggle flip-flop 203 is applied via an inverter 1501 (FIG. 15) to the D input of a gated delay flip-flop 1502. Similarly the timing output INCLK of the line receiver 114 is applied via an inverter to a skip pulse circuit 1401 (FIG. 14 and 15). Skip pulse circuit 1401 regenerates the incoming clock signal INCLK and applies its output signals to the control arrangements of the digital data receiver 102. As will be described in greater detail later herein, the skip pulse circuit 1401 is also employed in synchronizing the operation of digital data receiver 102. The outputs of skip pulse circuit 1401 are denoted SINCLK, which, during synchronism, is the regeneration of input clock INCLK, and signal $\overline{INCLK}$ which is the inverse of INCLK. The signals $\overline{INCLK}$ are applied to flip-flop 1502 and a matcher flip-flop 1503. Flip-flops 1502 and 1503 are used to compare the digit portions of each incoming digit to determine if code format violations (both permitted and nonpermitted) are present. Signal SINCLK is used to drive a twisted ring counter and timing translator 1402, which functions in a manner similar to twisted ring counter and timing translator 509 (FIG. 5). Twisted ring counter 1402 generates the signals AT through HT (FIG. 22), a complement of these signals referred to as AN through HN and various signals which are the logical combination of the signals AT through HT and AN through HN. In addition to the above signals, twisted ring counter and timing translator 1402 generates a signal CNTRADV from time $t_{5-6}$, which is transmitted to an address counter shown in FIG. 29. This address counter includes a 7-bit incrementable register 2901 which adds "1" to its least significant digit in response to each signal CNTRADV. Register 2901 thus generates a recurring sequence of binary addresses 0 through 127. The outut signals of register 2901 are applied to a decoder 2902 which generates signals W64 and W127 when register 2901 is storing the address of word 64 and word 127, respectively. In addition, a signal CLKOOF is generated at the sixth most significant digit stored by register 2901. The signal CLKOOF changes from a logical "0" to a logical "1" twice during each series of the addresses 0 through 127. The signals W64, W127 and CLKOOF are used by digital data receiver 102 to obtain and maintain synchronism with digital data transmitter 101.

Figure 17:
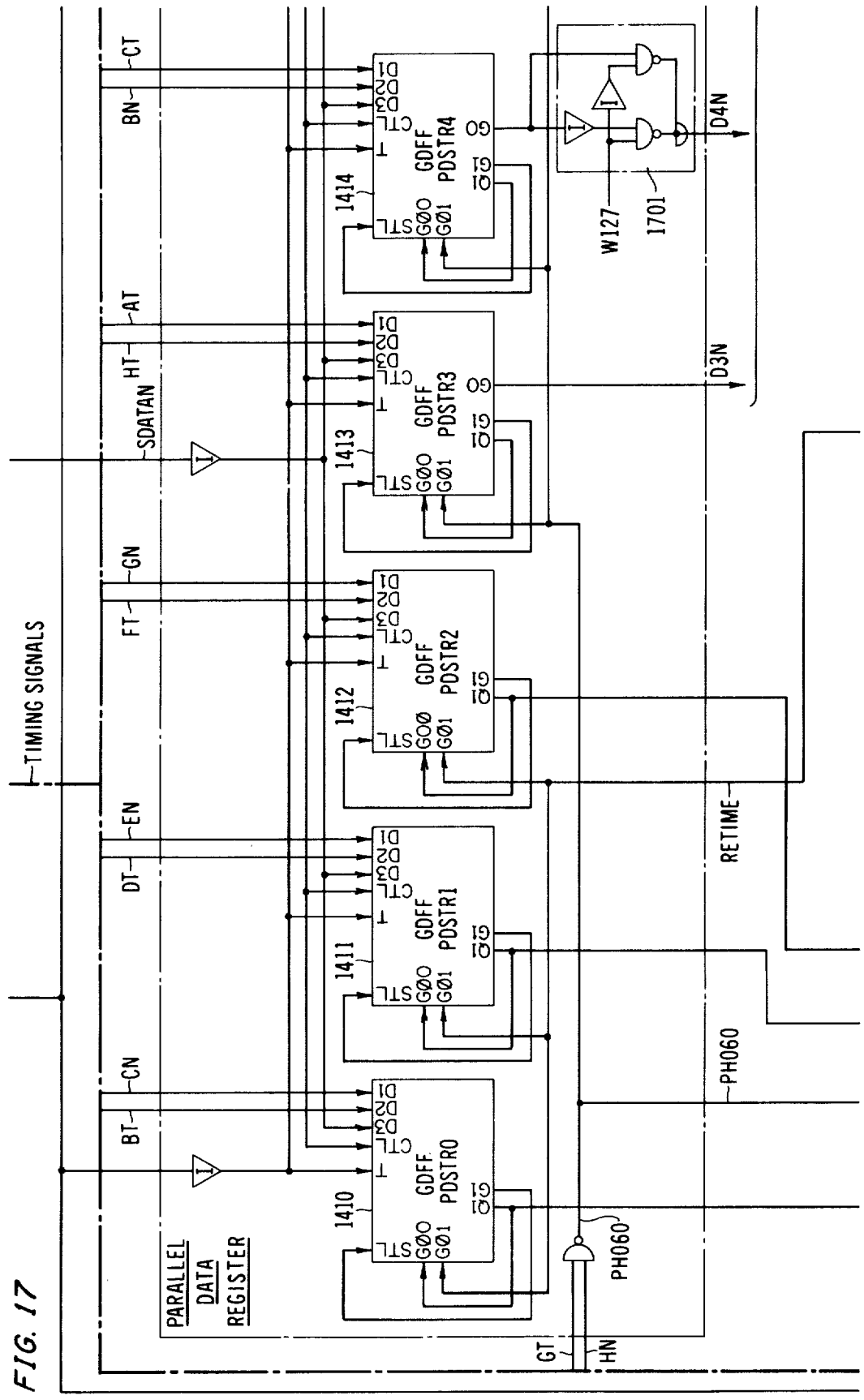
Figure 18:
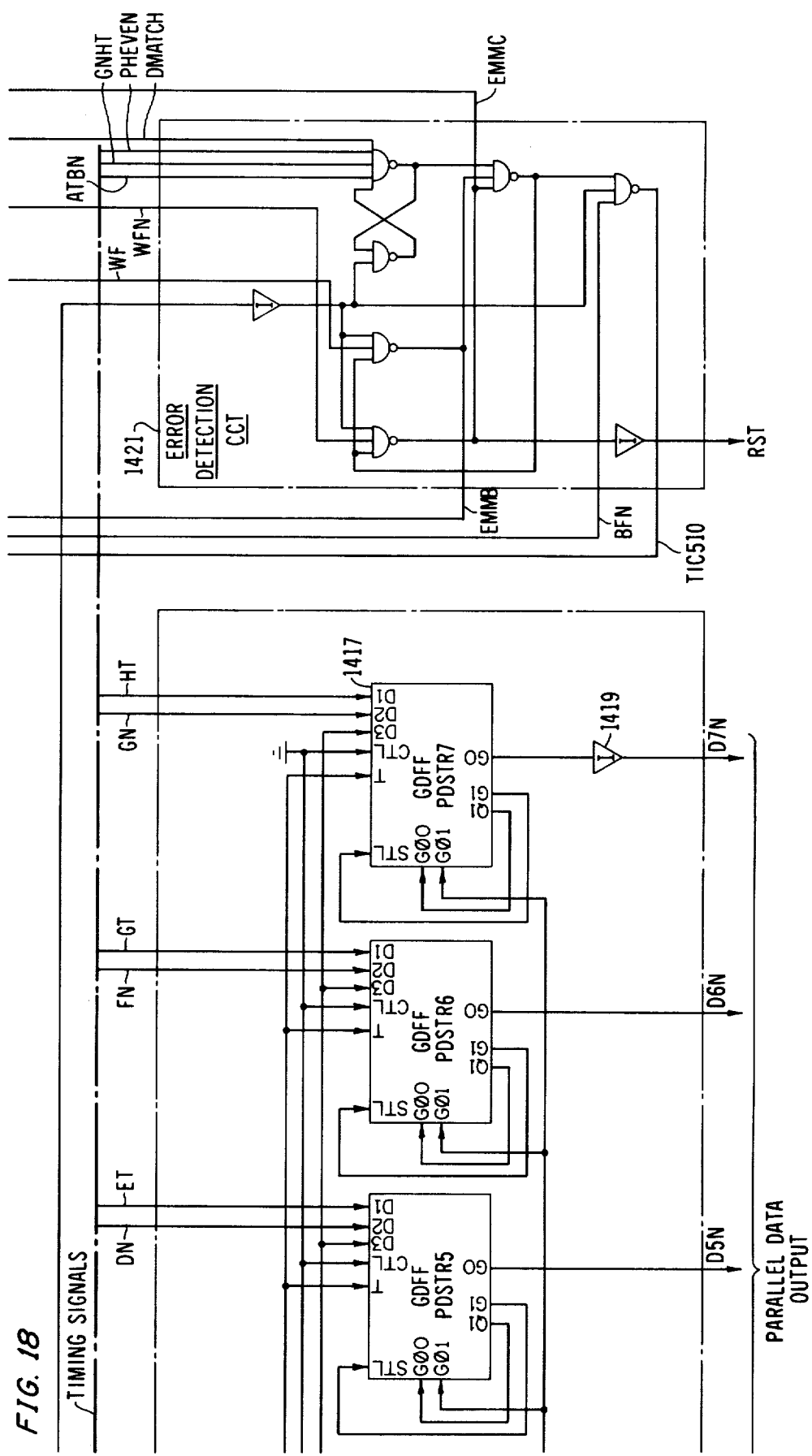
Figure 19:
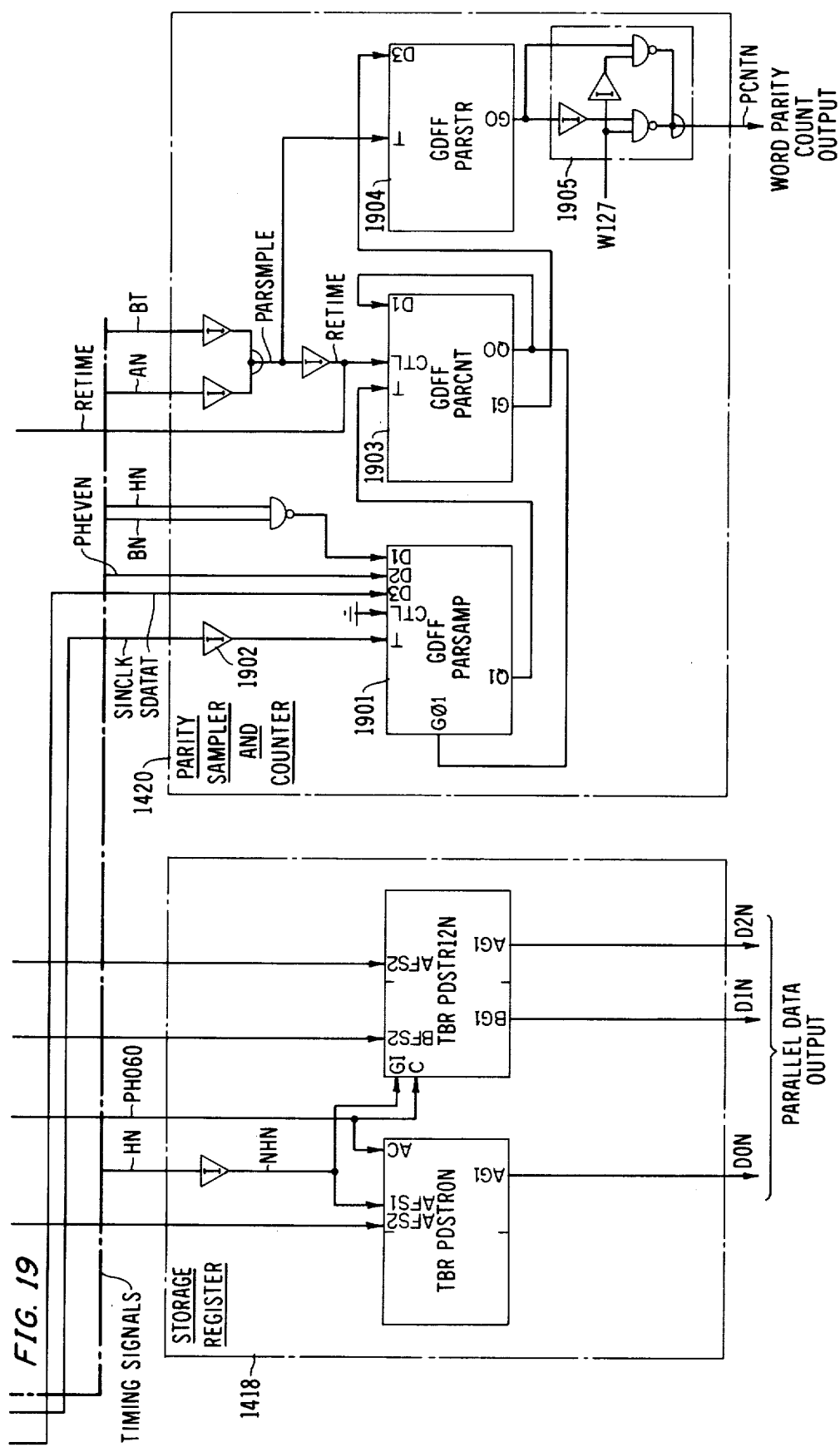

Flip-flop 1502 in response to the timing signals $\overline{INCLK}$ stores the signals present at its D input which represent the incoming stream of digit portions from transmitter 101. Since the $\overline{INCLK}$ pulses occur at approximately 61 nanosecond intervals, flip-flop 1502 stores each incoming digit portions for a period of time approximately equal to the time allocated to each digit portion. The output Q0 of flip-flop 1502, called SDATAN herein, represents the incoming stream of digit portions. SDATAN is inverted, producing $\overline{SDATAN}$, which is applied in common to a D input of eight gated delay flip-flops 1410 through 1417 (FIGS. 17 and 18). The connection of input CTL to ground and the connection of outputs G1 and Q1 to the inputs STL and GOO of gated delay flip-flops 1410 through 1417, negates any effect of their internal gate Q0 and produces a flip-flop from gates Q1 and G1 (FIG. 21). These modified gated delay flip-flops still retain the characteristic, however, that a logical "1" applied to each D input at the time of a "0" to "1" transition on its T input causes the logical "1" to be stored. As previously stated, signals $\overline{SDATAN}$ are applied to a first D input of the gated delay flip-flops 1410 through 1417. The incoming digits of a data word are stored in sequence in the flip-flops 1410 through 1417 by applying selective ones of the control signals AT through HN to the remaining D inputs of these flip-flops.

FIG. 24 is an example of the reception of data word 01111111 which is not word 127. Signal $\overline{SDATAN}$ is sampled in response to the above-mentioned signals from twisted ring counter and timing translator 1402 and stored in successive ones of flip-flops 1410 through 1417 at the times shown as logical "1's" on the line denoted parity sample and data register timing (FIG. 24). The signals stored by these flip-flops in response to the data word 01111111 and the times that such storage begins are shown in FIG. 24. At time $t_7$ the contents of flip-flops 1410, 1411, and 1412 are gated to a three-digit storage register 1418. This frees the first three-digit positions for a subsequent data word. Due to the data coding format and timing within the receiver 102, the digit portions which are generally the complement representation of each digit, are gated into the registers 1410 through 1417. Since digit D7 is used to convey channel synchronism, no complement portion exists for this digit. After time $t_{15}$ the eight digits of an incoming data word are available in parallel at the outputs of storage register 1418 and the GO outputs of flip-flops 1413 through 1417. Each of these outputs except flip-flop 1417 represents the complement of the actual data digit, however, the output of flip-flop 1417 includes an inverter 1419 to produce its complemented output. Later circuitry (not shown) is used to convert each parallel data word digit from the complement to the true representation.

FIG. 25 is an example of the reception of data word 10101010, which is word 127. It will be remembered that digit D4 of word 127 is used to convey both data and frame synchronizing information and thus only true digit portions are transmitted. Accordingly, no complement portion of digit D4 is transmitted during word 127. This example proceeds as the previous example (FIG. 24) except that since no complement is transmitted for digit D4, flip-flop 1414 (FIG. 25), which generally receives the complement of the digit portions, stores the complement of the incoming digit D4 rather than the true representation as in the previous example. This is corrected by circuit arrangement 1701, which inverts the output of flip-flop 1414 during word 127 in response to the previously mentioned signal W127 from the address counter of FIG. 29.

Figure 23:
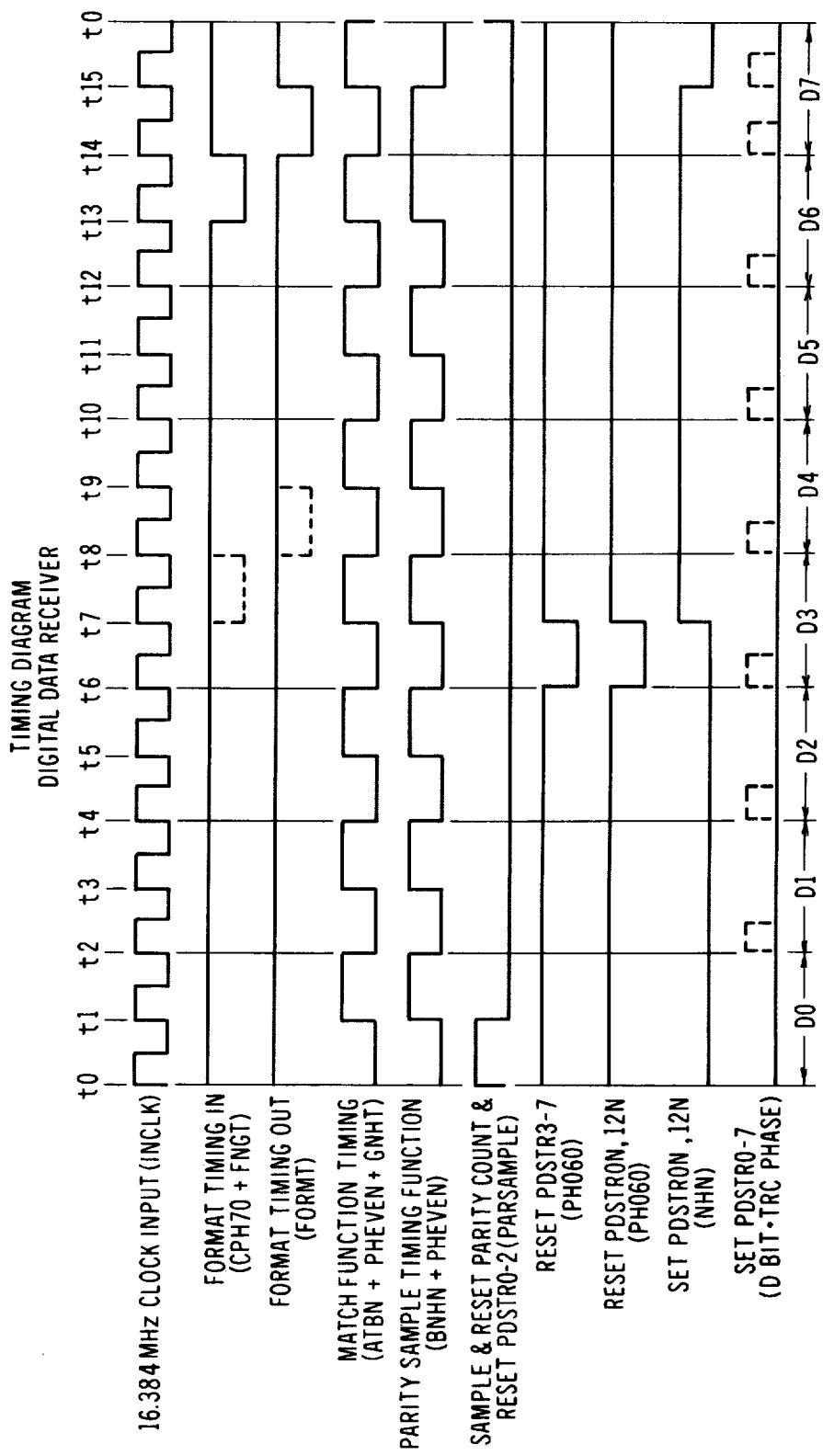

Digital data receiver 102 also calculates the parity of each data word. To this end the Q1 output (SDATAT) of serial data flip-flop 1502 is applied as a D input to a gated delay flip-flop 1901 of parity sampler and counter 1420. By the connection of terminal CTL of flip-flop 1901 to ground a logical "1" pulse is transmitted from its output Q1 for each logical "1" pulse applied to its T input while all of its D inputs are logical "1's". A combination of signals PHEVEN and BNHN (FIG. 23) from twisted ring counter and timing translator 1402 are applied to the inputs D1 and D2 of flip-flop 1901. The T input of flip-flop 1901 receives clock signals SINCLK as inverted by inverter 1902. In accordance with the above description, a parity sample is taken of the inverted complement portion of each incoming data bit at the times corresponding to the logical "1" shown in FIG. 24 and referred to as parity sample. It should be noted that the parity sample taken for bit D7 is a sample of the inverse of the true data bit, since neither of the digit portions of D7 is transmitted in complement form. Each Q1 output pulse from flip-flop 1901 is applied to the toggle input of a flip-flop 1903. The connection of output Q0 of flip-flop 1903 to its own input D1 changes its state each time it receives a logical "1" pulse from flip-flop 1901. Flip-flop 1903 thus acts as a parity counter. FIG. 24 shows the series of pulses PARSAMP Q1 at output Q1 at flip-flop 1901 for the incoming data word 01111111. At time $t_{0-1}$ signal PARSAMPLE (FIG. 23) is generated in accordance with signals AN and BT from twisted ring counter and timing translator 1402 and applied to the toggle input of a flip-flop 1904. This toggle pulse causes flip-flop 1904 to store the then present parity count of flip-flop 1903. The signal PARSAMPLE is also inverted and used to clear flip-flop 1903. The parity information stored by flip-flop 1903 and subsequently gated to flip-flop 1904 will be a "0" if an odd number of "1's" exist in the incoming data word or a logical "1" if an even number of "1's" are present in the incoming digital word. Since digit D7 of all data words is transmitted in true form only no compensation is required for it in the parity circuit. However, during word 127, both digit portions of digit D4 are transmitted in their true form. When the parity sample is taken at time $t_{9-10}$ a complemented representation of bit D4 is applied to flip-flop 1901 rather than the true input which would be applied for all other data words in the frame. For this reason the contents of flip-flop 1904 represent the inverse of the actual parity count during word 127. This is compensated for by a circuit 1905 which complements the output of flip-flop 1904 when the signal W127 is generated by the address counter of FIG. 29.

Digital Data Receiver Synchronization

The following is a description of the operations of digital data receiver 102 in obtaining synchronism. As previously stated, incoming digit portions are stored in flip-flop 1502 for approximately 61 nanoseconds. A selected output, i.e., G1 or G0 is then gated to a matcher flip-flop 1503 and a new digit portion is gated into flip-flop 1502. The new digit portion in flip-flop 1502 controls which output, i.e., G0 or G1 is to be gated from flip-flop 1503 on conductor DMATCH. If the contents of flip-flops 1503 and 1504 are the complement of one another, the signal DMATCH will be a logical "0". However, if they are not complementary, a logical "1" signal will be applied to DMATCH. The particular output of flip-flop 1502 to be gated to matcher flip-flop 1503 is defined by the outputs Q0 and Q1 of a format flip-flop 1504. Generally flip-flop 1504 gates the actual digit portion to matcher flip-flop 1503. However, the complement of the first digit portion of digit D7 for all data words and the complement of the first digit portion of digit D4 during word 127 are gated to flip-flop 1503, since no complement of these digits is transmitted in accordance with the coding format. Error detection circuit 1421 samples the signals on conductor DMATCH at the times shown as logical "1's" in FIG. 23 on the line denoted match function timing. If synchronism exists, signals on conductor DMATCH should be a logical "0" at those times since two portions of a given data word digit are then being "compared".

FIGS. 26 and 27 represent examples of the above described operations for a data word which is not word 127 and for a data word which is word 127, respectively. As shown in FIG. 26, the digit portion applied via SERD to the matcher flip-flop 1503 is generally the actual digit portion received (represented by SDATAN). This is altered at time $t_{4-15}$ by Format Timing Out (FIG. 26) so that a complement digit portion of digit D7 is gated to flip-flop 1503. The actual quantities "compared" are represented by th coexistent values of SDATAN and matcher Q0 (FIG. 26). At each logical "1" of match function timing (FIG. 26), the coexistent values of SDATAN and matcher Q0 are complements resulting in logical "0's" on conductor DMATCH during the sampling intervals. FIG. 27 represents a channel 127 data word so that no complement of digit D4 is received. Accordingly at time $t_{8-9}$ format timing out is a logical "0" causing a complement of D4 to be gated to flip-flop 1503 in the manner above described.

Figure 16:
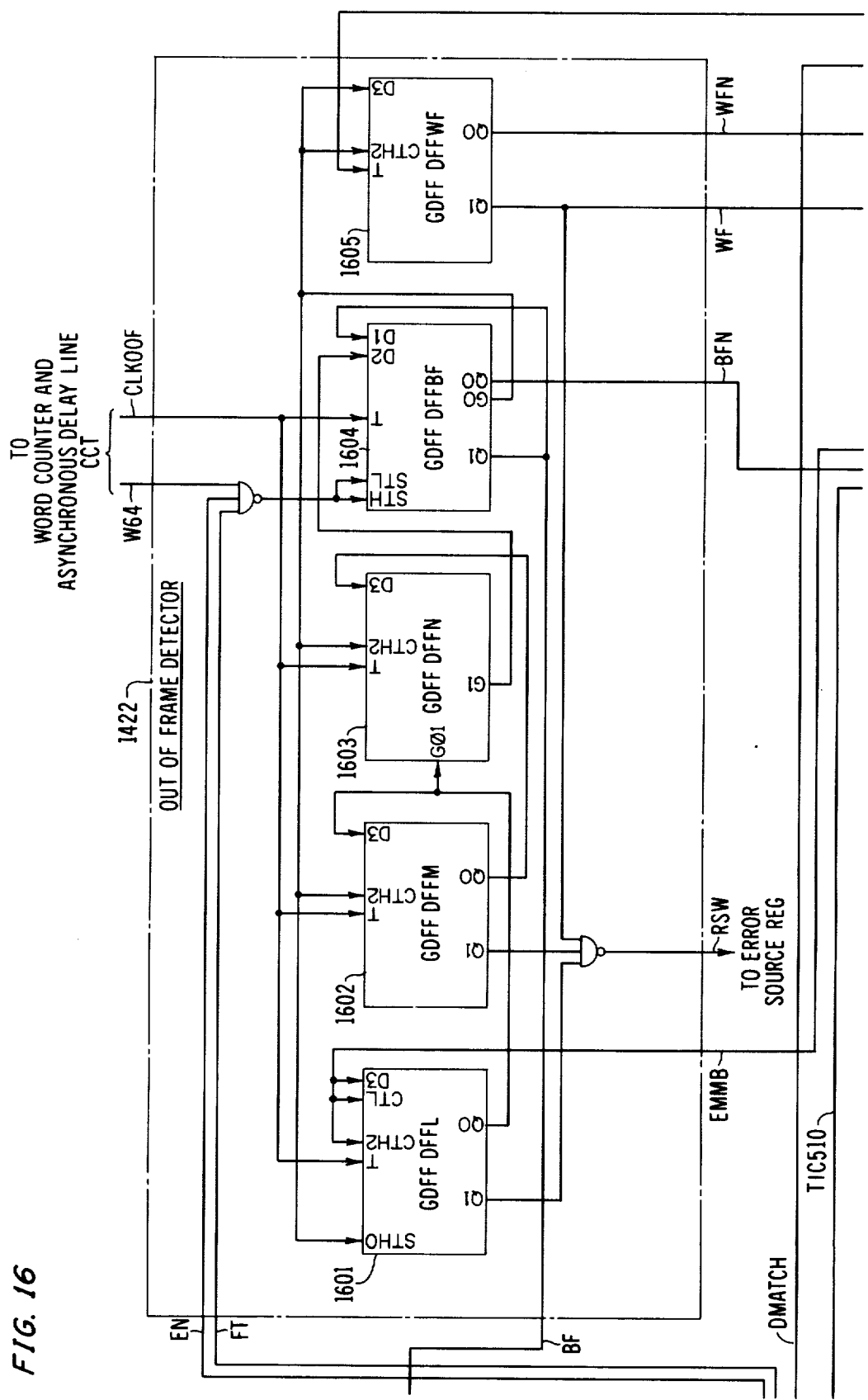

When a logical "1" signal occurs on DMATCH during one of the sampling intervals, it can indicate a transmission error or lack of synchronism. For this reason all such errors are both counted by out-of-frame detector 1422 and communicated to an error source register (not shown) via an output conductor RSW (FIG. 16) by means described below. A logical "1" signal on DMATCH during a sampling interval results in the generation of signal EMMB by error detection circuit 1421 which clears a flip-flop 1601 in out-of-frame detector 1422. The output Q1, of flip-flop 1601 is transmitted to the error source register via conductor RSW. Once every 64 channel time periods when a "0" to "1" transition occurs in signal CLKOOF, which is generated by the previously described address generator (FIG. 29), the logical "0" from flip-flop 1601 is used to set flip-flop 1602. If an additional error signal EMMB occurs, flip-flop 1601 will again be cleared. At the next occurrence of CLKOOF the contents of flip-flop 1602 will transfer to flip-flop 1603 and again the cleared state of 1601 results in the setting of flip-flop 1602. At the moment flip-flop 1601 is again cleared by error signal EMMB, its output Q0 will gate the contents of flip-flop 1603 to a D input of flip-flop 1604. This input results in flip-flop 1604 storing a logical "0" at the next "0" to "1" transition of the signal CLKOOF. Such a logical "0" in flip-flop 1604 results in both the generation of a logical "1" signal on conductor DFN which is transmitted to error detection circuit 1421 and the clearing of flip-flop 1605. When flip-flop 1605 is cleared, a signal WFN is transmitted to error detection circuit 1421. This combination of inputs to error detection circuit 1421 generates a singal TIC510 which is returned to skip pulse circuit 1401 and a signal RST which is transmitted to the address generator circuit (FIG. 29). In response to signal TIC510 skip pulse circuit skips a timing pulse on the conductor SINCLK. Skip pulse circuit 1401 operates in the manner described with respect to skip pulse circuit 508 (FIG. 5) to obtain bit synchronism. The address generator (FIG. 29) responds to the signal RST by resetting to an address output 127.

In the state described immediately above, each signal DMATCH will result in the resetting of the address generator to output 127 and the skipping of a pulse on conductor SINCLK. Since the resetting of address generator (FIG. 29) results in the generation of signal W127 at a time when it may not actually be word 127, out-of-frame detector 1422 transmits a signal BF to data formatter circuit 1423 to inhibit the format correction to digit D4 occasioned by the signal W127. When the error signals EMMB are no longer generated, the address counter (FIG. 29) is allowed to increment due to the absence of signal RST. If it increments to address 64 from address 127 without additional error, the signal W64 is generated and transmitted to out-of-frame detector 1422. The presence of this signal as controlled by timing signals EN and FT sets flip-flop 1604 at time $t_{12}$. The signal W64 indicates that 64 consecutive data words have been received without a mismatch, and it is assumed that channel synchronism exists. Thus, the next error should be caused by channel 127 occurring out of synchronism with address 127 of the address generator. When the next logical "1" signal DMATCH is generated, signal RST is again produced resetting address counter to address 127 and setting flip-flop 1603. At this point bit, word and frame synchronization between the incoming data stream, the digital data receiver 102 and the address generator (FIG. 29) exist.

Output Transmission System

The output signals of storage register 1418 and flip-flops 1413 through 1417 are transmitted to the time-division switching network 100 in parallel form. Additionally, the address generated by the address counter (FIG. 29) is transmitted along with each data word as indicia of its identity. Time-division switching network interconnects the various incoming channels into frames of outgoing channels, by means not important to the invention contained herein. Each frame of outgoing channels comprises 128 channels of parallel data words as does the input to digital data transmitter 101. These parallel data words are applied to a digital data transmitter 103 and thereby encoded into the predominately bipolar coding format previously described. Digital data transmitter 103 operates in a manner substantially identical to digital data transmitter 101. Timing and control information for digital data transmitter 103 is generated, however, in TSI timing and counter circuit 106 by a circuit arrangement substantially identical to the arrangement shown in FIG. 28. Digital data receiver 104 receives the incoming digit portion stream from digital data transmitter 103 and operates therein in a manner substantially identical to digital data receiver 102. Timing and control information for digital data receiver 104 is generated within voiceband interface frame 121 by an address counter substantially identical to that shown in FIG. 29.

What is claimed is:

1. A digital data transmitter comprising:
   a source of digital data words each comprising a plurality of binary digits in unique bit positions;
   formatting means responsive to said binary digits for generating a true representation and a complement representation of each of said binary digits;
   transmission control means for generating first control signals associated with pedetermined ones of said bit positions which are to convey data only, and for generating second control signals associated with predetermined ones of said bit positions which are to convey both data and synchronizing information; and
   transmitting means responsive to said control signals for transmitting a combination of said ture and complement representations of each binary digit having a bit position associated with one of said first control signals and for transmitting a true representation only of each binary digit having a bit position associated with one of said second control signals.

2. The digital data transmitter in accordance with claim 1 wherein said transmitting means transmits said true representations only in substantially the same time duration in which said combined true and complement representations are transmitted.

3. The digital data transmitter in accordance with claim 2 wherein said transmitting means further comprises means for transmitting a bipolar signal in response to said combination of said true and complement representations and for transmitting a unipolar signal in response to said true representations only.

4. A digital data transmitter comprising:
a source of digital data words each comprising a plurality of binary digits in unique bit positions;
timing means for generating a plurality of equally spaced timing signals;
formatting means for generating the true representation and the complement representation of binary digits;
gating means responsive to said timing signals for gating said binary digits, in a sequence determined by said unique bit positions, to said formatting means;
transmission control means for generating first control signals in time synchronism with the gating to said formatting means of bit positions which are to convey data only and for generating second control signals in time synchronism with the gating to said formatting means of bit positions which are to convey both data and synchronizing information; and
transmitting means responsive to said first control signals for transmitting a combination of said true and complement representations of each binary digit gated to said formatting means in synchronism with a first control signal and responsive to said second control signals for transmitting the true representation only of each binary digit applied to said data formatting means in synchronism with said second control signals.

5. The digital data transmitter in accordance with claim 4 wherein said transmitting means transmits said true representations only in substantially the same time duration in which said combined true and complement representations are transmitted.

6. The digital data transmitter in accordance with claim 5 wherein said transmitting means further comprises means for transmitting a bipolar signal in response to said combination of said true and complement representations and for transmitting a unipolar signal in response to said true representations only.

7. A digital transmitter for transmitting data words in recurring channels of a time-division multiplexed system comprising:
a source of digital data words each comprising a plurality of binary digits in unique digit positions;
timing means for generating a plurality of equally spaced timing signals;
an address counter responsive to said timing signals for generating address signals uniquely identifying each data word channel;
formatting means responsive to said binary digits for generating a true representation and a complement representation of each of said binary digits;
transmission control means for generating first control signals associated with predetermined ones of said bit positions which are to convey data only and for generating second control signals associated with the remaining ones of said bit positions which are to convey both data and synchronizing information;
means responsive to said address signals for inhibiting one of said first control signals associated with a predetermined bit position during a predetermined data word channel and for generating a second control signal associated with that predetermined bit position in said predetermined data word channel; and
transmitting means responsive to said control signals for transmitting a combination of the true representation and the complement representation of each binary digit having a bit position associated with one of said first control signals and for transmitting a true representation only of each binary digit having a bit position associated with one of said second control signals.

8. A digital data transmission system comprising:
a digital data transmitter for transmitting serial data words each comprising a plurality of binary digits in unique bit positions wherein bipolar representations are transmitted in predetermined ones of said bit positions and unipolar representations are transmitted in the remaining bit positions; and
a digital data receiver comprising:
timing means for generating a plurality of equally spaced timing signals;
reception control means responsive to said timing signals for generating first reception control signals associated with said predetermined ones of said bit positions in which bipolar representations are to be received and for generating second reception control signals associated with the remaining bit positions in each of said digital data words; and
error detection means responsive to said binary digits and said first and said second reception control signals for generating error signals when one of said first reception control signals is associated with a unipolar digit and when one of said second reception control signals is associated with a bipolar digit.

9. A digital data transmission system of claim 8 wherein said digital data receiver further comprises means responsive to said error signals for modifying the association of said first and said second reception control signals with said bit positions.

10. The method of serially transmitting digital data words and synchronizing information wherein each data word comprises a plurality of digits in unique digit positions, comprising steps of:
1. defining at least one of said bit positions as the bit position to convey both data and synchronizing information in all digital words,
2. transmitting a true representation followed by a complement representation of each data word digit which is not in a bit position defined in step 1 to convey both data and synchronizing information, and
3. transmitting a first true representation followed by a second true representation of each data word digit in a bit position defined in step 1 to convey both data and synchronizing information.

11. The method of serially transmitting data words and synchronizing information in recurring frames of a plurality of data word channels wherein each data word comprises a plurality of digits in unique digit positions comprising the steps of:
1. defining at least one of said bit positions in all of said data words as the bit position to convey both data and channel synchronizing information,
2. defining at least one of said bit positions in one of said recurring channels as the bit position to convey both data and frame synchronizing information,
3. transmitting a true representation followed by a complement representation of each data word digit which is not in a bit position defined in steps 1 or 2 to convey both data and synchronizing information, and
4. transmitting a first true representation followed by a second true representation of each data word digit in a bit position defined in steps 1 or 2 to convey both data and synchronizing information.

12. A digital data transmitter comprising:
a source of digital data words each comprising a plurality of binary digits in unique bit positions;
formatting means responsive to said binary digits for generating a true representation and a complement representation of each of said binary digits;
transmission control means for generating first control signals associated with predetermined ones of said bit positions which are to convey data only, and for generating second control signals associated with predetermined ones of said bit positions which are to convey both data and synchronizing information; and
transmitting means for transmitting two digit portion signals to represent each binary digit of said data words, said two digit portion signals comprising a true representation and a complement representation of each binary digit having a bit position associated with one of said first control signals and said two digit portion signals each comprising a true representation of each binary digit having a bit position associated with one of said second control signals.

13. In combination:
means for generating a true representation and a complement representation of each of a plurality of binary digits; and
transmitting means for transmitting a true representation and a complement representation of predetermined ones of said binary digits to convey only the information content of said predetermined binary digits and for transmitting a true representation only of the remaining ones of said binary digits to convey both synchronizing information and the information content of said binary digits.

14. The combination in accordance with claim 13 wherein said transmitting means transmits each of said true representations only in substantially the same time duration in which said combined true and complement representations are transmitted.

15. An arrangement for simultaneously transmitting data and synchronizing information in a data word comprising:
a source of digital data words each comprising a plurality of binary digits in unique bit positions;
means for defining certain of said bit positions to convey both data and synchronization information;
means for transmitting a true representation followed by a complement representation of each digit in bit positions other than those defined by said defining means; and
means for transmitting a first true representation followed by a second true representation of each digit in a bit position defined by said defining means.

16. In a transmission system for transmitting data words in recurring frames each comprising a plurality of data words in time separated channels, an arrangement for simultaneously transmitting data and synchronizing information comprising:
an address generator for generating a recurring series of addresses, each address being uniquely representative of one of said time separated channels;
means for generating bit position indicia uniquely identifying each of said bit positions;
means, responsive to said address and said bit position indicia, for defining certain of said bit positions to convey both data and synchronizing information;
means for transmitting a true representation followed by a complement representation of each digit in bit positions other than those defined by said defining means; and
means for transmitting a first true representation followed by a second true representation of each digit in a bit position defined by said defining means.

17. An arrangement for simultaneously transmitting data and synchronizing information in a data word comprising:
a source of digital data words each comprising a plurality of binary digits in unique bit positions and each of said bit positions including a first portion and a second portion;
means for generating format signals defining certain of said bit positions to convey data and other bit positions to convey both data and synchronizing information;
means for transmitting a data signal in the first portion of each of said bit positions, said data signal being dependent on the data information being transmitted; and
means, responsive to said format signals, for selectively transmitting said data signal or its complement in the second portion of each of said bit positions in accordance with said defining means.

18. An arrangement for simultaneously transmitting data and synchronizing information in digital data words comprising:
a source of digital data words each comprising a plurality of binary digits in unique bit positions; and
means for transmitting digit representations, each comprising two associated portions, to represent each data word digit, wherein a first portion of each digit representation comprises a first or a second symbol to represent a binary one or binary zero, respectively, and the second portion of predetermined digit representations comprises the complement of the symbol transmitted in its associated first portion and the second portion of each remaining digit representation comprises a symbol identical to its associated first portion symbol.

* * * * *